(12) United States Patent
Cha et al.

(10) Patent No.: US 12,475,875 B2
(45) Date of Patent: Nov. 18, 2025

(54) COMPUTER-IMPLEMENTED METHOD FOR GENERATING ANTI-NOISE

(71) Applicant: University of Manitoba, Winnipeg (CA)

(72) Inventors: Young-Jin Cha, Winnipeg (CA); Alireza Mostafavi, Winnipeg (CA)

(73) Assignee: University of Manitoba, Winnipeg (CA)

(*) Notice: Subject to any disclaimer, the term of this patent is extended or adjusted under 35 U.S.C. 154(b) by 169 days.

(21) Appl. No.: 18/436,614

(22) Filed: Feb. 8, 2024

(65) Prior Publication Data
US 2024/0274114 A1 Aug. 15, 2024

Related U.S. Application Data

(60) Provisional application No. 63/498,308, filed on Apr. 26, 2023, provisional application No. 63/484,638, filed on Feb. 13, 2023.

(51) Int. Cl.
*G10K 11/178* (2006.01)

(52) U.S. Cl.
CPC .. *G10K 11/17823* (2018.01); *G10K 11/17873* (2018.01); *G10K 2210/3011* (2013.01); *G10K 2210/3027* (2013.01); *G10K 2210/3038* (2013.01); *G10K 2210/3044* (2013.01)

(58) Field of Classification Search
CPC ....... G10K 11/17823; G10K 11/17873; G10K 2210/3011; G10K 2210/3027; G10K 2210/3038; G10K 2210/3044

USPC ...................................................... 381/71.8
See application file for complete search history.

(56) References Cited

U.S. PATENT DOCUMENTS

| | | | |
|---|---|---|---|
| 2020/0118537 A1* | 4/2020 | Zhao | G10K 11/17823 |
| 2020/0380945 A1* | 12/2020 | Woodruff | H04R 1/1016 |
| 2021/0065731 A1* | 3/2021 | Matsukawa | G10K 11/1785 |
| 2021/0161498 A1* | 6/2021 | Hu | G01R 33/3854 |

* cited by examiner

*Primary Examiner* — Katherine A Faley
(74) *Attorney, Agent, or Firm* — Ryan W. Dupuis; Kyle R. Satterthwaite; Ade & Company Inc.

(57) ABSTRACT

A method for generating anti-noise comprises receiving a sound signal representative of ambient sound including noise from a noise source, anti-noise from an anti-noise generator, and propagation noise from environment; processing the sound signal using a deep learning algorithm configured to generate an anti-noise signal to form anti-noise; and outputting the anti-noise signal to the anti-noise generator. The deep learning algorithm features an iterative encoder module forming plural feature maps; an attention module generating plural attention maps respectively based on the feature maps; a recurrent neural network (RNN), with long short-term memory layers receiving the feature map of the final iteration of the encoder module, predicting a future portion of the sound signal and modelling temporal features of the feature map of the final encoder module iteration; and an iterative decoder module mapping the output of the RNN to the anti-noise signal having common dimensions as the sound signal.

11 Claims, 11 Drawing Sheets

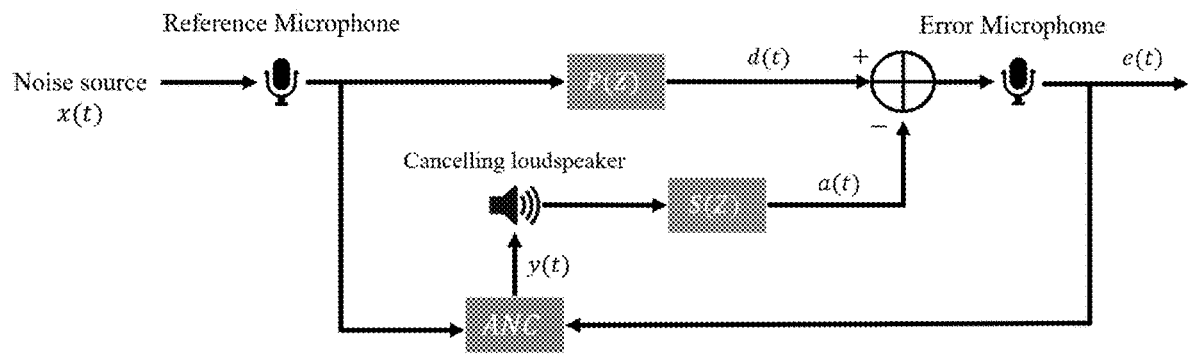
FIG. 1 – PRIOR ART
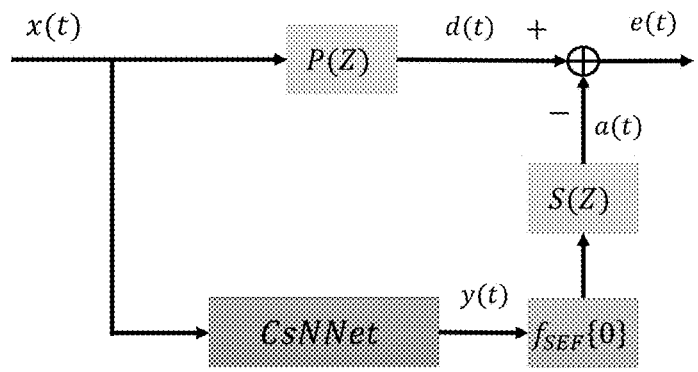
FIG. 2

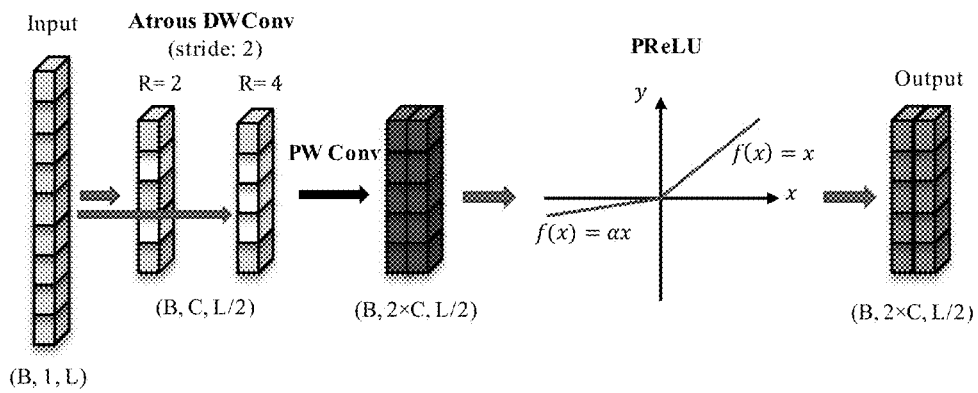
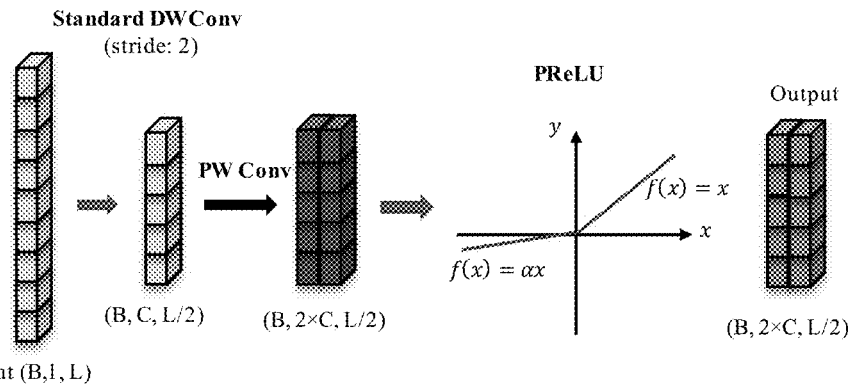
(B, C, L) = (batch size, number of channel, signal length)
FIG. 4

COMPUTER-IMPLEMENTED METHOD FOR GENERATING ANTI-NOISE

This application claims the benefit under 35 U.S.C. 119(e) of U.S. provisional application Ser. No. 63/484,638, filed Feb. 13, 2023, and of U.S. provisional application Ser. No. 63/498,308, filed Apr. 26, 2023.

FIELD OF THE INVENTION

The present invention relates to a computer-implemented method for generating anti-noise to suppress noise, and more particularly to such a method in which a sound signal representative of ambient sound including noise, anti-noise and propagation noise from the environment is processed using a deep learning algorithm configured to predict a future portion of the sound signal, for subsequently generating the anti-noise.

BACKGROUND

Environmental noises negatively influence human mental health and work performance, and can lead to blood pressure and memory loss over time [1]. Other side effects of exposure to high noise levels, particularly above 85 dB, include irregular heartbeat, speech problems, insomnia, and permanent hearing loss [2,3]. Workers on construction sites are at risk of these outcomes because noise levels are usually above 85 dB due to loud machinery [3,4]. To avoid the adverse effects of excessive noise, workers on construction sites are forced to use earplugs or earmuffs, which have been considered the best solution for a long time. This is called passive noise cancelation (PNC), which isolates space from outside noises by implementing a noise- and vibration-absorbing design. Although using earplugs or earmuffs assists workers in attenuating construction noises, employees and people residing near construction sites still suffer from the loud noise, and this can affect their mental health and work performance. It is also unreasonable to ask all construction center workers to wear earplugs or earmuffs.

Construction activities in densely populated metropolises have increased in recent decades, and there is still no effective solution for managing related noise. Many attempts have been made to passively manage induced noise from construction activities and equipment. These efforts include using soundproof barriers, enclosures, and silencers at construction centers [5]. However, these passive methods have a limited ability to mitigate low-frequency noises, and their effects are limited to high-frequency noises [5-7]. Thus, conventional noise barriers seem to have a negligible impact on construction sites since most sources of construction noise produce energy in low-frequency regions, such as 500 Hz [5,8]. Furthermore, PNC methods cannot help workers on construction sites because they only reduce noise levels outside construction sites, not on the construction site itself, and they may also impede airflow.

Active noise control (ANC) can be used as a constructive approach to tackling these issues in the construction industry and may preserve workers from irreversible hazards. ANC can be defined as generating an anti-noise signal with the same amplitude and opposite phase of undesired noise to attenuate the primary noise [9]. It is a noise cancelation technique based on the principle of acoustic superposition that has received increasing attention from researchers in recent years [9,10].

Kwon et al. [8] proposed a feedforward ANC method to supplement PNC limitations on construction sites. Their results showed that 7-10 dB noise attenuation could be achieved for low- and mid-frequency band noises up to one kHz, and the algorithm performance degraded facing high-frequency noises and noise from equipment that made impact sounds, such as jackhammers and rock drills. In [11] the suitability and optimum location of ANC equipment, including source and error microphones and speakers on passive noise barriers in urban construction sites, were investigated, and the results showed that the noise mitigation level increased from 11.7 dB using PNC to 20 dB using both ANC and PNC in the street area. This is called an active noise barrier (ANB). ANB has sets of microphones and speakers controlled by a digital feedforward adaptive controller (for example FxLMS method). The installed ANC units in the slit or on the top of the noise barriers mitigate low-frequency noises that leak through conventional noise barriers. However, their method was highly sensitive to the position and distance of the noise source from active sound barriers.

It is worth mentioning that the erection of ANBs is still the most prevalent noise cancelation measure owing to their ability to handle multiple moving noise sources in open space environments, such as construction sites [12] or traffic roadways [13], which has been operationally demonstrated. However, there is little evidence of the widespread adoption of ANBs outside of these few instances due to their negligible effects in compensation for the high costs of installation and maintenance. It seems that the most successful applications of ANC are related to local noise attenuation, as they physically cancel noises in a small and limited area, for example, in headsets [14] or automobiles [15] and aircraft interiors [16]. Few attempts have been made to improve ANC or ANB techniques to mitigate noise in open space environments, especially construction sites [17]. Construction site noise pollution is considered a constant global threat to public health but is often neglected. In recent years, there have been many complaints and disputes concerning noises induced by construction activities and their related machinery, resulting in cost overruns and delays in the construction process [8]. Due to the crucial role of the construction industry in this period of the rapid growth of cities, effective measures should be taken to alleviate this issue.

ANC systems can be classified into two main groups: feedback and feedforward [18]. A typical feedforward ANC system uses two microphone signals, reference and error microphones, to tune an adaptive filter and produce anti-noise. The impinging noise signal can be canceled by the superposition of the generated anti-noise, as shown in FIG. 1. In this figure, the primary path P(z) represent the physical path between the reference and error microphones, and the secondary path S(z) denotes the transfer function of the physical path from the canceling speaker to the error microphone. The output of ANC (y(t)) passes through the secondary path to produce anti-noise signals (a(t)) using a loudspeaker. Finally, the error noise is measured after the superposition of the produced anti-noise signal with input noise x(t) filtered by the primary path.

Feedback ANC systems work with only an error microphone to adapt the controller, so it is easier to implement them than feedforward ANC methods that use reference signals. However, feedback ANC systems have known constraints in canceling out broadband noises, and they can only mitigate narrowband noises [9,17]. As a result, most scientists prefer to use feedforward ANC methods, and the successful application of feedforward ANCs have been demonstrated in aircraft, automobiles, headrests, and earphones [17].

Filtered-x least mean square (FxLMS) and its variants are the most widely used ANC algorithms due to their robustness and simplicity [9]. Conventional LMS algorithms and linear adaptive filters do not take the secondary path into consideration. However, there are unavoidable nonlinearities in sensors and acoustic paths [19] because of the substandard and limited quality of loudspeakers and amplifiers. It has been demonstrated that even small nonlinearity in the secondary path negatively influences the behavior of these algorithms [8], which destroys their effectiveness. As a result, the FxLMS algorithm [21] has been proposed to deal with secondary path nonlinearities [9]. Since then, many studies have attempted to further improve this method for tackling nonlinear distortions, such as leaky-FXLMS [23], filtered-s LMS [24], bilinear FxLMS [12], and THF-FxLMS [26]. The working principle of the FxLMS algorithm and its variations are based on estimating the secondary path $\hat{S}(z)$ with a finite impulse response (FIR) filter. Then, to compensate for nonlinearities in the secondary path, the reference noise signal is filtered by $\hat{S}(z)$ before updating the controller's weights. Consequently, the performance of this type of ANC depends on the accuracy of this estimation, and the performance of these algorithms is limited when faced with strong nonlinearities [9,19] due to the linear nature of FIR filters. Moreover, these traditional algorithms show negligible attenuation of transient and high-frequency noises and noise from equipment that releases impact sounds, such as jackhammers and rock drills [8].

Some machine-learning-based ANC algorithms have also been developed to cancel nonstationary noises in nonlinear ANC problems. In [27,28], multilayer perceptron (MLP) neural networks were employed for active noise control applications. Na et al. [29] applied a recurrent neural network (RNN) for a single-sensor-based ANC of acoustic noise. They showed that RNN outperformed MLP and FxLMS algorithms due to its ability to model time-varying signals such as acoustic noises. Due to recent developments in artificial neural network (ANN) algorithms, the availability of a sufficient amount of data, and powerful processing power, ANC has seen substantial growth. Park et al. [10] proposed two newly designed ANN architectures using LSTM and a convolutional neural network (CNN) for feedforward ANC. Their simulation results showed that memory neural networks, specifically LSTM networks, perform better than previously published ANC algorithms, including MLP and RNN. However, they ignored the effect of the primary and secondary paths in their simulations, which introduces phase distortions and delays to undesired and anti-noise signals, respectively.

Recent advancements in computational processing power and the availability of sufficient amounts of data have allowed scientists to incorporate deep artificial neural networks to tackle highly complex real-world problems [30, 31]. To deal with the shortcomings of conventional ANC algorithms, Zhang and Wang [9] employed a monocular speech enhancement network [32] for the frequency domain feedforward ANC problem. Their model was a deep convolutional autoencoder with two units of LSTM applied to feature space before feeding features to the decoder modules. By considering all possible nonlinearities in the ANC system, they could obtain around 10 dB noise attenuation for disturbances up to 8 kHz. However, their network had over 9 million trainable parameters, which were primarily designed for speech enhancement problems. This huge model introduces significant delays in real-time ANC problems, where even a negligible delay results in algorithm degradation [33]. The whole ANC system must not violate causality constraints [33,34]; otherwise, the performance of the ANC algorithm deteriorates considerably. To respect causality, the time taken for the algorithm to produce the anti-noise signal, plus the propagation time of canceling noise waves from the loudspeaker to the error microphone location, should be less than the propagation time of the primary noise from the reference microphone to the error microphone location. Overall, to the best of our knowledge, there is no efficient deep learning-based ANC method for construction sites.

SUMMARY OF THE INVENTION

According to an aspect of the invention there is provided a computer-implemented method for generating anti-noise using an anti-noise generator to suppress noise from a noise source in an environment, the computer-implemented method comprising:

receiving a sound signal representative of ambient sound in the environment including the noise from the noise source and the anti-noise from the anti-noise generator, wherein the ambient sound also includes propagation noise from the environment;

processing the sound signal using a deep learning algorithm configured to generate an anti-noise signal to form anti-noise, wherein the deep learning algorithm comprises:

an encoder module configured to receive the sound signal and to perform feature extraction to form a feature map, wherein the encoder module comprises a plurality of atrous separable convolutions and a plurality of depthwise separable convolutions, wherein the encoder module is iterated so as to have plural iterations thereof and thereby forming a plurality of feature maps;

an attention module configured to receive the feature maps of the plural iterations of the encoder module and to generate plural attention maps respectively based thereon;

a recurrent neural network having plural layers of long short-term memory type and configured to receive the feature map of a final one of the iterations of the encoder module, wherein the recurrent neural network is configured to predict a future portion of the sound signal and to model temporal features of the feature map of the final iteration of the encoder module; and a decoder module configured to receive an output of the recurrent neural network and the attention maps from the attention module, wherein the decoder module is configured to map the output of the recurrent neural network to the anti-noise signal having common dimensions as the sound signal, wherein the decoder module comprises a plurality of transposed atrous separable convolutions and a transposed depthwise separable convolution, wherein the decoder module is iterated so as to have plural iterations thereof; and outputting the anti-noise signal to the anti-noise generator.

This provides an arrangement for generating anti-noise including predicted future anti-noise based on the received sound signal.

In the illustrated arrangement, when the sound signal is captured by a single audio sensor configured to capture sound, the deep learning algorithm further comprises a pointwise convolution after the decoder module and configured to receive an output thereof.

In the illustrated arrangement, the encoder module comprises:
- an input layer configured to form an output thereof the same as an input thereto;
- a first one of the depthwise separable convolutions configured to receive the output of the input layer of the encoder module;
- a first one of the atrous separable convolutions having a first dilation rate and configured to receive the output of the input layer of the encoder module;
- a second one of the atrous separable convolutions having a second dilation rate different than the first dilation rate and configured to receive the output of the input layer of the encoder module;
- a second one of the depthwise separable convolutions receiving as input thereto concatenated outputs of the first depthwise separable convolution and the first and second atrous separable convolutions and forming an output of a respective one of the iterations of the encoder module;
- wherein, for a first one of the iterations of the encoder module, the input of the input layer is the sound signal; and
- wherein, for subsequent ones of the iterations of the encoder module after the first iteration thereof, the input of the input layer is the output of the second depthwise separable convolution;
- wherein the outputs of the encoder module comprise the outputs of the second depthwise separable convolution of the iterations of the encoder module.

In the illustrated arrangement, the encoder module is iterated four times.

In the illustrated arrangement, the second dilation rate is twice the first dilation rate.

In the illustrated arrangement, the first dilation rate is two and the second dilation rate is four.

In the illustrated arrangement, final depthwise convolutions of each of the depthwise separable convolutions and the atrous separable convolutions are followed by a parametric rectified linear unit activation function.

In the illustrated arrangement, the decoder module comprises:
- an input layer having a first concatenated portion and a second concatenated portion which are concatenated to form an output of the input layer of the decoder module, wherein, in a first one of the iterations of the decoder module, the first concatenated portion of the input layer is the output of the recurrent neural network and in each subsequent one of the iterations after the first iteration, the first concatenated portion is the output of a preceding one of the iterations of the decoder module, wherein the second concatenated portion is a respective one of the attention maps of the attention module;
- a first one of the transposed atrous separable convolutions having a first dilation rate and configured to receive an output of the input layer of the decoder module;
- the transposed depthwise separable convolution being configured to receive the output of the input layer of the decoder module;
- a second one of the transposed atrous separable convolutions having a second dilation rate different than the first dilation rate of the first transposed atrous separable convolution and configured to receive the output of the input layer of the decoder module; and
- an output layer configured to form an output of the decoder module in the form of a summation of outputs of the first and second transposed atrous separable convolutions and the transposed depthwise separable convolution.

In the illustrated arrangement, the decoder module is iterated four times.

In the illustrated arrangement, the second dilation rate of the second transposed atrous separable convolution is twice the first dilation rate of the first transposed atrous separable convolution.

In the illustrated arrangement, the first dilation rate of the first transposed atrous separable convolution is two and the second dilation rate of the second transposed atrous separable convolution is four.

BRIEF DESCRIPTION OF THE DRAWINGS

The invention will now be described in conjunction with the accompanying drawings in which:

FIG. 1 is a diagram of a typical feedforward active noise control/cancellation (ANC) system;

FIG. 2 is a block diagram of a feedforward deep-learning-based ANC according to an arrangement of the present invention, which may be referred to as CsNNet for convenient reference;

FIG. 4 shows ASC and DSC architectures, where B, C and L refer to batch size, number of channels, and signal length, respectively;

In the drawings like characters of reference indicate corresponding parts in the different figures.

DETAILED DESCRIPTION

Referring to the accompanying figures, there is shown a lightweight deep convolutional recurrent neural network with an attention mechanism named construction site noise network, which may be referred to as CsNNet for convenient reference. CsNNet may improve feedforward ANC controllers for attenuating highly nonstationary and nonlinear noises of construction sites by considering unavoidable nonlinearities in acoustic and electrical paths. CsNNet comprises activation functions, convolutional layers, LSTM units, and an attention module.

In this research, a single sensor-based feedforward active noise controller (CsNNet) was formulated as a supervised learning problem. FIG. 2 illustrates the diagram of the proposed system. The P(z) and S(z) are frequency responses of physical primary and secondary paths, respectively, $f_{SEF}\{0\}$ denotes the function of the canceling loudspeaker, and CsNNet is an attention-based deep convolutional recurrent neural network that generates a canceling signal y(t), which passes through the physical and electrical secondary path to create anti-noise a(t).

The error signal can be calculated using the following equation:

$$e(t) = d(t) - a(t) = x(t) * p(t) - f_{SEF}\{CsNNet(x(t)\} * s(t) \qquad (1)$$

where p(t) and s(t) are impulse responses of primary and secondary paths, $f_{SEF}\{0\}$ is the function of the loudspeaker, x(t) represents the reference microphone signal, and * represents the linear convolution. Ignoring the loudspeaker function and setting the error signal to zero, the z transform of Equation (1) can be written as:

$$E(z) = X(z)(P(z) - W(z)S(z)) \qquad (2)$$

where W (z) is the CsNNet weight. The goal is to minimize or eliminate the error signal, so the ideal solution for E (z)=0 is:

$$W(z) = \frac{P(z)}{S(z)} \qquad (3)$$

Based on Equation (3), the primary role of the ANC algorithm is to model the primary path and inverse of the secondary path. Direct estimation of W(z) for traditional adaptive algorithms such as FxLMS, which attempts to estimate a linear FIR filter, is complicated. In most cases, it will lead to algorithm divergence because of nonlinearities in electrical and physical secondary paths.

In this disclosure, the supervised learning method is used to not only estimate W (z), but also predict upcoming noise samples to compensate for the processing delay. In other words, deep learning techniques are incorporated to alleviate ANC complexities while respecting its constraints. It should be noted that the well-trained network produced the anti-noise signal just by feeding the reference microphone signal, without an error microphone. This contrasts with conventional adaptive methods that require error signals to continuously adapt an FIR filter as a controller weight [21]. CsNNet is not an adaptive controller; thus, the instability of convergence does not occur during real-time active noise cancelations.

CsNNet Architecture

Figure 3:
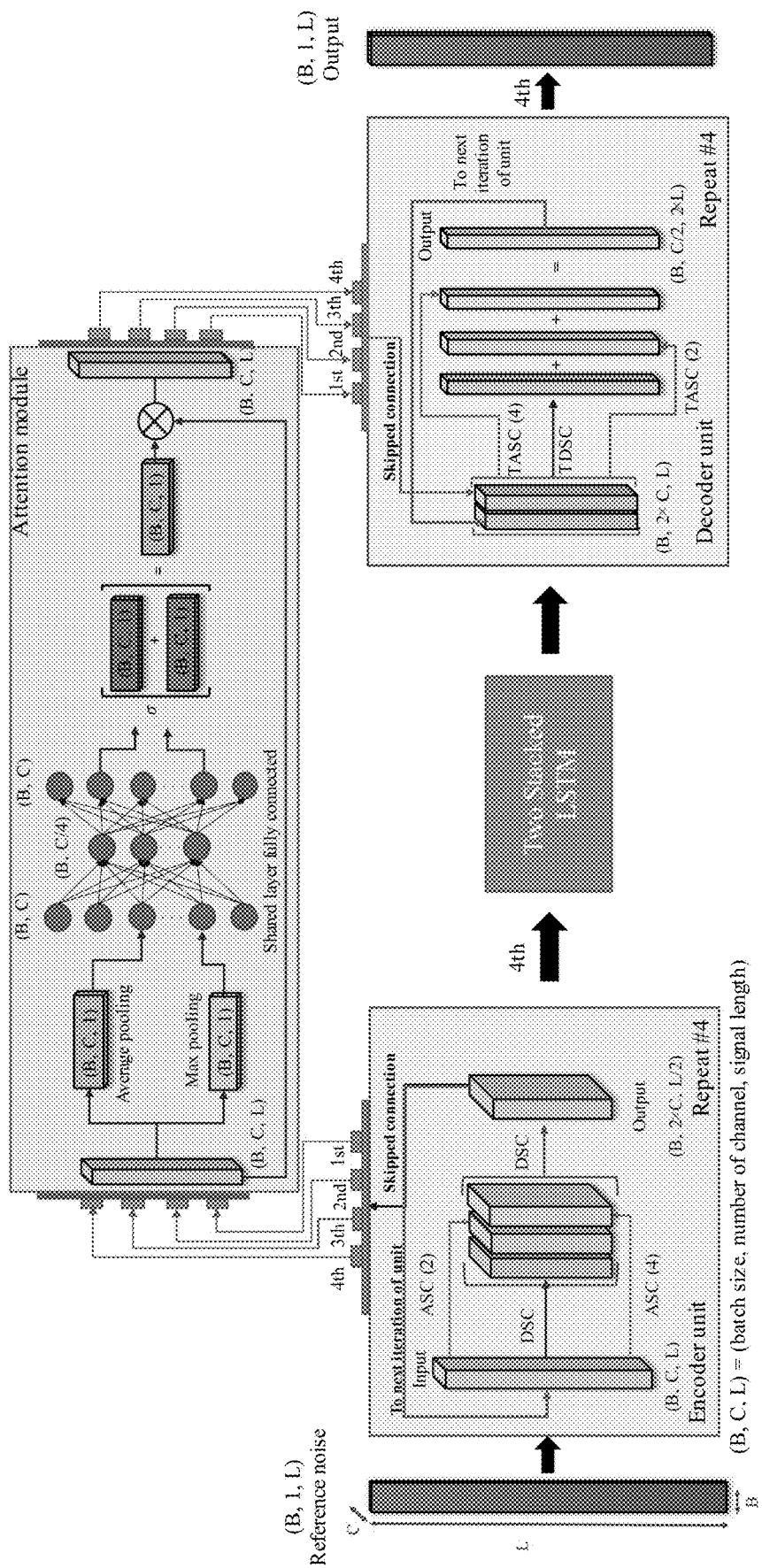
FIG. 3 is a diagram showing architecture of CsNNet.

A novel deep convolutional recurrent neural network is designed for active noise cancelation, as shown in FIG. 3. CsNNet comprises a series of new encoder units to extract effective multiscale features from the one-dimensional (1D) time series input data, two stacked LSTM units that serve as the brain of the network to extract temporal behaviors of noises and predict future anti-noise samples considering any time delays in the processing, and a series of new decoder units to map the feature space to the destructive canceling signal with the same size as the input noise. Skipped connections after each encoder unit with an attention module were also employed to maintain low-level features, ensure feature reusability [35], and intelligently select and exploit effective feature maps. The input and output dimensions of layers, convolutions filter size, and hidden state size of LSTM layers are also tabulated in Table 1.

For raw acoustic signals, scientists usually use a large input signal (L) in deep learning models [36-38] to provide their networks with a large receptive field. For instance, in a recent speech enhancement model [36], an input 1D signal (C=1) with a size of L=8,192 samples for acoustic data sampled at 16 kHz was used, and Stoller et al. [37] utilized input data with a length of L=16,384 samples received by 22,050 Hz sampling frequency for audio source separation. In [38], four seconds of raw acoustic data sampled at 8 kHz (L=4×8,000=16,000 samples) was inputted to a deep model for speech separation. Although providing the model with a large receptive field would help it achieve better performance, due to strict latency constraints in ANC systems, using large input data can be challenging. In the illustrated arrangement, L=512 for data sampled at a 16 kHz sampling frequency and L=1,024 for a 48 kHz sampling frequency. The total number of trainable parameters of the network is 128,500, which makes it suitable for real-time applications with its corresponding small input size (L=512 or L=1,024).

I. Encoder

The main role of the encoder developed for CsNNet is to extract effective and rich information from the raw small input signal with minimum processing power and latency. The overall schematic view of the developed encoder units used in CsNNet is presented in FIG. 3. The encoder unit that is repeated four times comprises two atrous separable convolutions (ASCs), two depthwise separable convolutions (DSCs), and a skipped connection, as shown in FIG. 3. The output of ASCs is concatenated with the output of one DSC, and another DSC is applied to combine multilevel extracted features. The output feature maps of each encoder unit take two paths. One is fed to the next iteration of the encoder unit, and the other is inputted to the attention module as a skipped connection. The output of the attention module is fed into the corresponding decoder unit, as shown in FIG. 3. The value in parentheses of ASC is the dilation rate (R) for the 1D atrous convolution.

FIG. 4 illustrates the ASC and DSC operations. The ASC comprises an atrous depthwise (DW) convolution (Conv) and a pointwise (PW) Conv. DSC comprises a standard DW Conv and a PW Conv, as shown in FIG. 4. The roles of the ASC and DSC are to extract multiple levels of invariant features from the input data with minimum computational costs suitable for real-time processing and low-latency systems. In particular, DSC can reduce the number of parameters of normal convolutions, thereby decreasing computational costs while preserving similar (or even slightly better) performance [39]. The filter size of DW Convs in the ASC and DSC is 16, and stride 2 with appropriate padding is utilized to reduce the length of feature maps by a factor of 2 after each repetition of the encoder unit. Then, a PW Conv is utilized to combine extracted features by DW Convs, followed by the PReLU activation function [40]. The DW Convs in ASC are atrous Convs with a dilation rate of R (=2 or 4), and the standard DW convolution is incorporated into DSC. As shown in FIG. 4, the output signal length (L) is halved, and the number of channels (C) is doubled after DSC and ASC modules, except for DSC and ASC in the first encoder, in which the number of channels increases from 1 to 8.

After every ASC and DSC, batch normalization [41] is adopted to accelerate training processes and shrink the internal covariant shift, followed by a parametric rectified linear unit (PReLU) activation function [40]. As described in Equation (4), PReLU mimics the behavior of the rectified linear unit (ReLU) activation function when the input is greater than zero, but the negative slope of the rectifier is controlled by the trainable scaler parameter of $a \in \mathbb{R}$. In other words, a gives the CsNNet the ability to choose how much negative data passes to the next layer of the network from each layer.

$$PReLU(x) = \begin{cases} x & \text{if } x > 0 \\ ax & \text{if } x \leq 0 \end{cases} \tag{4}$$

II. Decoder

The main role of decoder units is to map the output of stacked LSTM layers to effective anti-noise of the same size as the input reference noise, with the help of low-level features refined by the attention mechanism. Each decoder unit is designed with two transposed atrous separable convolutions (TASCs) with dilation rates of 2 and 4, and one transposed depthwise separable convolution (TDSC), as shown in FIG. 3. The outputs of two TASCs and one TDSC were added together to form the output feature maps of each decoder unit. To create TASC and TDSC, the DW convolution in ASC and DSC is replaced with transposed atrous and standard DW convolutions, respectively, with stride 2. As a result, instead of reducing the signal length (L), TASC and TDSC increase the length of input signal by a factor of 2 and drop the number of channels from 2×C to C/2. After each decoder unit repetition, the feature map size doubles, and the number of input channels decreases by a factor of 4. One PW convolution was applied to the output of the last decoder unit to combine feature maps and reduce the number of channels from 4 to 1. The filter size of the DW convolution in TASC and TDSC was set as 8. The input to decoder units is a concatenation of low-level features selected by the channel attention module and the previous decoder unit's outputs, except for the first one, which is the output of LSTM units, as depicted in FIG. 3.

III. Channel Attention Module

The 2D channel attention developed in [42] for an image classification task is modified for use herein for 1D feature maps to give the network the ability to intelligently select effective feature maps before concatenation with decoder unit output. FIG. 3 illustrates the architecture of channel attention, where global average and max pooling are applied to the input data to aggregate information. Both squeezed features were fed into a shared layer fully connected autoencoder separately, and their outputs were merged using element-wise summation. Sigmoid activation was then applied to the merged descriptors to create the channel attention map. Finally, the input features were multiplied by the generated attention map to emphasize effective feature maps and understate the irrelevant features. The produced attention map can be described by the following equation:

$$M_c(X) = \sigma(W_2\delta(W_1 AvgPool(X)) + W_2\delta(W_1 MaxPool(X))) \tag{5}$$

where X is the input feature map with C number of channels fed into the attention module, $$W_1^{\frac{C}{4} \times C} \text{ and } W_2^{C \times \frac{C}{4}}$$

denote weights of the fully connected network, and $\delta$ and $\sigma$ represent ReLU and sigmoid activation functions, respectively. As previously mentioned, $W_1$ and $W_2$ were shared for squeezed features obtained by the global average and max poolings.

IV. Long Short-Term Memory (LSTM)

Figure 5:
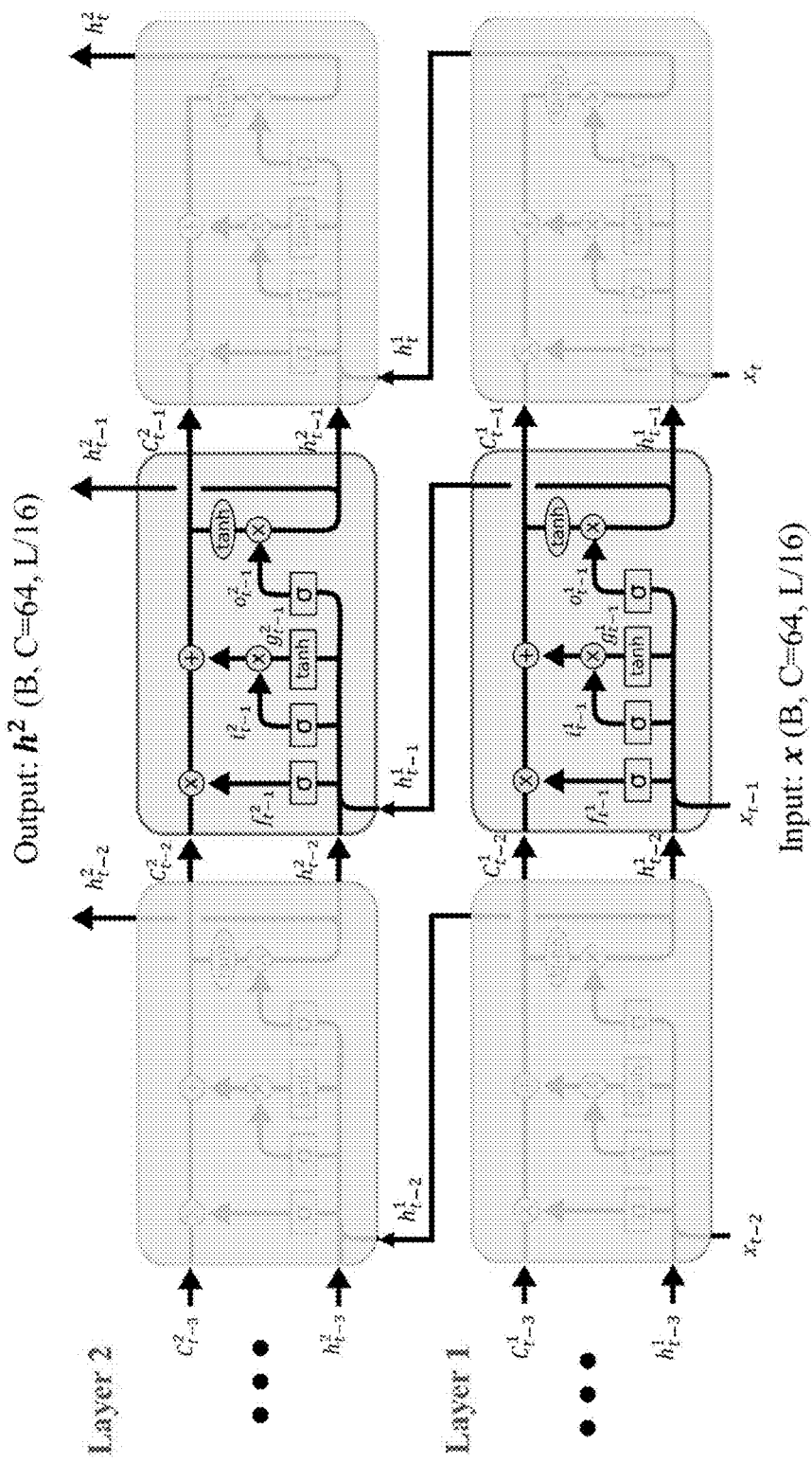
FIG. 5 shows two stacked LSTM units with $x_t$ as input and hidden state $h_t$ as output.

To cancel unwanted noises from construction sites, anti-noises should be generated with the same amplitude and opposite phase. In ANC systems, there are various types of time delays, such as processing delays caused by ANC algorithm computation (i.e., CsNNet); all electro-acoustic equipment in ANC systems, including analog to digital converter (ADC), digital to analog converter (DAC), and amplifier and loudspeaker delays; and secondary path delay (i.e., the acoustic propagation delay of the anti-noise signal from the loudspeaker to the error microphone). There might also be various nonlinearities in acoustic signal generator devices (amplifiers and loudspeakers), including the reverberation of sound where it is produced. Consequently, two stacked LSTM layers were utilized to predict upcoming noise in such a nonlinear situation and to model the temporal aspects of the input data, as depicted in FIG. 5. LSTM also helps CsNNet follow the behavior of impulse construction noises, such as hammering or jackhammer noises. Due to the advanced nature of LSTM compared to the traditional recurrent neural network (RNN), which uses special units along with standard ANN components, memory cells in LSTM networks allow information storage for a long period of time, and LSTM can address the vanishing gradient or gradient blow-up present in conventional RNNs [43]. FIG. 5 depicts two stacked LSTMs at different elapsed times. The input x to the first LSTM unit is the output of the final encoder unit, and the output is the hidden state $h^1$, which is fed to the second layer as input. The hidden state of the last unit $h^2$ is fed into the first decoder unit. Since the hidden state size is set equal to the input size, the output of each LSTM unit has an equal dimension to the input.

The following equations describe the first LSTM unit used in this disclosure. The equations for the second unit will be the same, except that instead of x, $h^1$ is used.

$$i_t = \sigma(W_{ii}x_t + b_{ii} + W_{hi}h_{t-1} + b_{hi}) \tag{6}$$

$$f_t = \sigma(W_{if}x_t + b_{if} + W_{hf}h_{t-1} + b_{hf}) \tag{7}$$

$$g_t = \tanh(W_{ig}x_t + b_{ig} + W_{hg}h_{t-1} + b_{hg}) \tag{8}$$

$$o_t = \sigma(W_{io}x_t + b_{io} + W_{ho}h_{t-1} + b_{ho}) \tag{9}$$

$$c_t = f_t \odot c_{t-1} + i_t \odot g_t \tag{10}$$

$$h_t = o_t \odot \tanh(c_t) \tag{11}$$

As shown in FIG. 5, $x_t$ is the input data to the LSTM unit, and $h_t$ and $c_t$ represent the hidden state and cell state of LSTM at time t, respectively. $i_t$ is input gate, and $f_t$, $g_t$, and $o_t$ denote forget, cell, and output gates, respectively. Moreover, $\sigma$ is the sigmoid activation, $\odot$ is the element-wise multiplication, and W and b are the weights and biases of the LSTM unit, respectively.

V. Loss Function and Optimizer

Input to the CsNNet is a time-series sample noise with a length of L, and the output is predicted anti-noise for future samples of impinging noise. A mean squared error (MSE) loss function, one of the most widely used loss functions in the literature for regression problems, was used to calculate the error of predicted anti-noise (a) by considering the secondary path effects and ideal anti-noise â. It should be noted that the target anti-noise â was created before the training processes by filtering the reference noise with the primary path impulse response. B is the batch size of the data in each iteration to speed up the learning process.

$$MSE = \frac{1}{B}\sum_{k=0}^{B}(\hat{a}(k) - a(k))^2 \quad (12)$$

The ADAM optimizer [44] was utilized, as it is the best replacement for the stochastic gradient descent (SGD) algorithm. It is an efficient optimizer that requires little memory to run. Utilizing this method, the ability of RMSProp to deal with nonstationary objectives was combined with the capability of AdaGrad to handle sparse gradients, such that optimization and updating of the learning machine parameters are more robust and efficient [44]. For the Adam algorithm, mean, and uncentered variance, the first and second hyperparameters were set as 0.9 and 0.999, respectively, and an initial learning rate of 0.002 was used to update the network's weights in each iteration using back-propagation through the training process. The learning rate is halved when there is no reduction in test loss in three consecutive epochs, and the training process is stopped if the test loss does not decrease noticeably in 20 consecutive epochs.

Experimental Setup

Construction noise data are established, and simulation tools and procedures are presented for modeling a realistic construction site by simulation of physical primary and secondary paths and nonlinearity of acoustic equipment, such as loudspeakers. A performance metric is introduced for the evaluation of the proposed network and comparison algorithms, and the results of the case studies are described and discussed.

I. Construction Noise Data

The primary goal of CsNNet is to attenuate or eliminate noise produced by construction activities. Thereby the proposed network should be trained with a variety of construction environmental noises to be able to predict anti-noises in nonlinear situations. High-quality construction noises were downloaded from a sound effects library [45] with a sampling frequency of 48 KHz and 16-bit resolution. The resulting data comprised 17 types of construction noises generated from bulldozers, grader machines, cement mixers, excavators, construction trucks, filing wood, hammering, electric drills, screwdrivers, grinders, hand saws, hydraulic jackhammers, electric sanders, saw machines, and welding, as presented in Table 2.

For each noise type, multiple recordings from different distances were concatenated then scaled between −1 and 1. Each noise category was divided into training (60%) and testing (40%) data. Consequently, 60 seconds of training data for each noise type were randomly selected and concatenated to create the training set, as shown in Table 2. Furthermore, the test set included a concatenation of 20 seconds of randomly selected raw time-domain noises from the test data for each noise type. Using this measure, the test data is ensured as to be different from the training data; hence, the robustness and generalizability of the network could be evaluated. Overall, the total durations of the training and test data were 17 minutes and 340 seconds, respectively. The training and test sets were also down-sampled to 16 kHz, and the performance of the network is evaluated and described in further detail later.

In addition, the network was evaluated using mixtures of noises, as described in Table 3. Three mixed noises (MN) were created by adding 20 seconds of distinct types of machinery or activity noise. This validation procedure is more realistic than testing the network with a single type of noise because, most of the time, different noises occur simultaneously on construction sites. The training set for this test scenario is also a mixed dataset with randomly combined machinery and activity noises with a duration of 3 minutes. It should be noted that there was no overlap between the training and testing datasets for these mixtures of noises.

For training the network, the collected data with 16 kHz sampling frequency was converted into frames with lengths of L=512 samples and 256 samples overlapping between consecutive frames. For 48 KHz data, the frame length and overlapping number of samples were also selected as 1024 and 512 samples, respectively.

II. Primary and Secondary Paths. Loudspeaker Effects and Causality Issue

Figure 6:
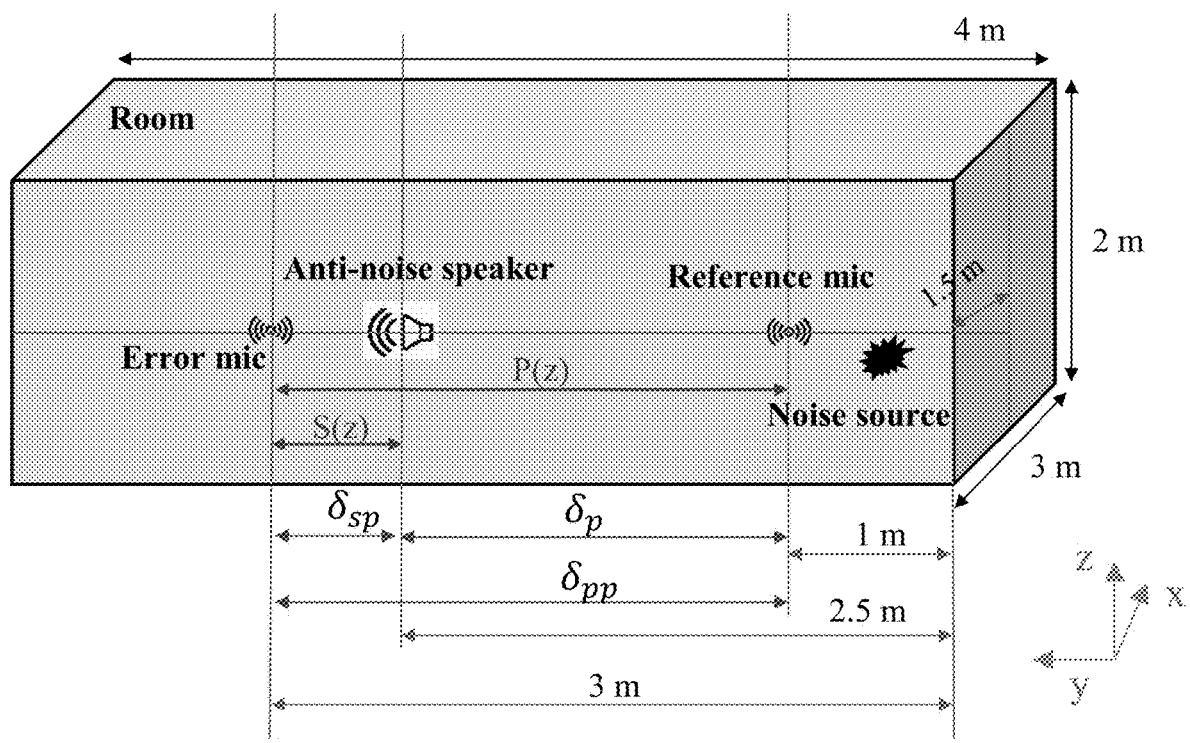
FIG. 6 is a diagram of a simulated room for generating RIRs.

To consider the physical primary and secondary path effects, P(z) and S(z) were introduced in FIG. 2. To simulate these two functions and consider the physical primary and secondary path effects, the image method was implemented to generate room impulse responses (RIRs), which have been used in many studies [9,47,48]. To generate RIRs for the primary and secondary paths, this image method, which is available with the Python function (rir_generator), requires inputs such as the size of space, reverberation time, RIR number of samples as the output, and locations of the error microphone, reference microphone, and anti-noise speaker. As an example, a space with a size of [3 m, 4 m, 2 m] would be simulated with a reference microphone located at [1.5 m, 1 m, 1 m], an error microphone at [1.5 m, 3 m, 1 m], and a loudspeaker installed at [1.5 m, 2.5 m, 1 m], as shown in FIG. 6. The RIRs' number of tabs was set as 512 samples for 16 kHz data and 1024 for 48 KHz data to ensure the capture of long reverberations. These numbers were based on trial-and-error simulations, and they are also in line with [9]. The reverberation times (T60 s) of 0.15 s, 0.2 s, and 0.25 s were used for training, and 0.2 s was used for testing the trained model, which is considered the average reverberation time for a room of this size [9]. The reverberation time (RT) describes the amount of time it takes for the volume of sound in a room to decay over a specific dynamic range, usually defined as 60 dB (T60 s), after a sudden interruption of the sound source [49].

Figure 7:
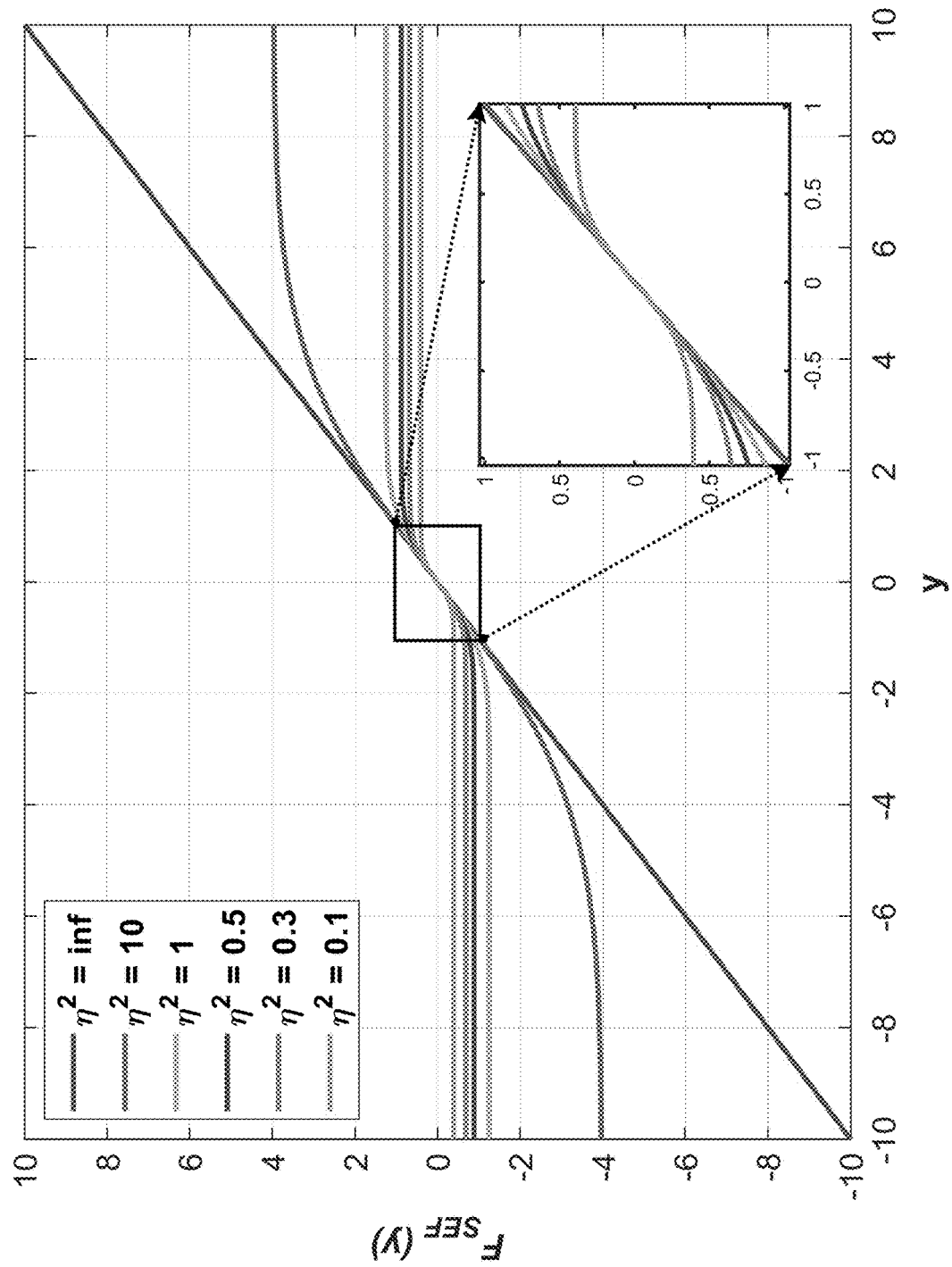
FIG. 7 is a graph showing Scaled error functions for various levels of nonlinearity ($\eta^2$)

Another issue that should be considered in this ANC is that the actual anti-noises generated by the loudspeaker and the predicted anti-noise signals by the active noise controllers (e.g., CsNNet) are different, which is a common phenomenon [9,20,26]. There is a nonlinear relationship between the two noises. To simulate this nonlinearity, the scaled error function (SEF), $f_{SEF}(\,)$ given by [50] was implemented as follows:

$$f_{SEF}(y) = \int_0^y e^{-\frac{z^2}{2\eta^2}} dz \quad (13)$$

where y is the input (i.e., the predicted anti-noise signals by the active noise controllers) to the loudspeaker, which is equal to y(t) in FIG. 2, and $\eta^2$ represents the degree of nonlinearity. The robustness of CsNNet is investigated in the presence of severe nonlinearity ($\eta^2=0.1$), moderate nonlinearity ($\eta^2=0.5$), and linearity ($\eta^2=\infty$). FIG. 7 illustrates the $f_{SEF}(y)$ versus y. When $\eta^2=0.1, 0.5, 1, 10, \infty$, the maximum magnitude of the anti-noise signal with the presence of the saturation effect of the loudspeaker can be ±0.3963, ±0.8862, ±1.2533, ±3.9571, and too, respectively, based on Equation (13), as shown in FIG. 7.

Another issue that should be considered when evaluating the developed ANC method is the causality constraint. The causality constraint for feedforward ANC systems [33,34] can be summarized by the following equation:

$$\delta_p + \delta_{sp} < \delta_{pp} \tag{14}$$

where $\delta_p$ is the processing delay caused by ANC algorithm computation (proposed CsNNet) and all electro-acoustic equipment in ANC systems, such as ADC, DAC, and amplifier and loudspeaker delays. $\delta_{sp}$ represents the secondary path delay, which is the acoustic propagation delay of the anti-noise signal from the loudspeaker to the error microphone, as shown in FIG. 6. Finally, $\delta_{pp}$ denotes the primary path delay, which is the time taken for the reference noise to travel from the reference microphone to the error microphone location, as shown in FIG. 6. Therefore, simply speaking, the left term of Equation (4) should be shorter than that of the noise travel time to the error microphone. A very fast processing method to reduce $\delta_p$ is used to realize this.

The calculated $\delta_{pp}$ ($\approx 2$ m/340 m/s) is 5.9 ms. The $\delta_p+\delta_{sp}$ should be smaller than this to satisfy the causality issue. The average inference time of the CsNNet for input data with L=512 on the TITAN V GPU was calculated at around 11.1 ms, which is only part of the $\delta_p$. The calculated $\delta_{sp}$ was 0.5/340≈1.5 ms. Then, without considering all electro-acoustic delays in ANC systems, such as ADC, DAC, and amplifier and loudspeaker delays that are part of the $\delta_p$, the time consumed is 12.6 ms (=11.1 ms+1.5 ms), which is greater than 5.9 mm (=$\delta_{pp}$ ms). Therefore, it is impossible to use CsNNet as an ANC method using the TITAN V GPU based on this scenario. To compensate for the processing delay that causes the causality issue, the CsNNet is designed to predict future anti-noise signals by considering 12.6 ms−5.9 ms=6.7 ms. Possible further time delays due to ADC, DAC, and amplifier and loudspeaker delays should be considered, which can be microseconds. Therefore, if the CsNNet can predict an anti-noise of more than 6.7 ms, it is enough to consider all possible time delays to remove any causality issues. This means that the CsNNet is trained in such a way that always produces 12.5 ms (as an example time)×16 KHz=200 samples of anti-noise in advance. Therefore, CsNNet-200 was generated to address various time delays.

III. Evaluation Criteria

In [10,51], as in most literature on ANC, noise attenuation is used as a performance metric to compare the effectiveness of ANC systems. It can be calculated using Equation (15).

$$\text{Noise attenuation} = 10\log\frac{\sum_{i=1}^{L} d^2}{\sum_{i=1}^{L} e^2} \tag{15}$$

Equation (15) presents noise attenuation in dB, where d and e are reference noise and residual noise, respectively, and L is the length of the input signal by which the network has been tested. Noise attenuation is utilized to compare the accuracy and effectiveness of the proposed method with other newly published state-of-the-art ANC systems.

IV. Case Studies

The CsNNet without time delay consideration and CsNNet-200 with time delay consideration were trained and tested using previously described data in Table 2, hyperparameters, and a training strategy on a workstation with a GPU (NVIDIA TITAN V) with 64 GB of available RAM. The FxLMS algorithm [21] was utilized to compare performance with construction data. As explained in the Introduction, the FxLMS algorithm outperforms the traditional LMS when there are nonlinearities in the secondary path. The controller filter length of the FxLMS algorithm was set as equal to the impulse response lengths of the primary and secondary paths. Since FxLMS is sensitive to step size, the optimal step size was based on trial and error, which is the most common way to set the parameter. CsNNet and CsNNet-200 were trained and tested separately with the datasets described in Table 2, including noise data sampled at 48 KHz and 16 kHz sampling frequencies. The noise attenuation results of the network for both datasets with different sampling frequencies were the same. Hereinafter, the results of the network are reported, as achieved on the data with a 16 kHz sampling frequency since most commercial microphones use this sampling rate.

Table 3 shows the performance of the proposed CsNNet compared to one (FxLMS) of the representative existing methods to cancel the 17 different construction site noises with different nonlinearity levels. The performance of CsNNet and FxLMS are compared with different levels of nonlinearities from severe (i.e., $\eta^2=0.1$) to none (i.e., $\eta^2=\text{inf}$). From the 17 different construction site noises, the proposed CsNNet showed the best performance at all different levels of nonlinearity. The CsNNet achieved average noise attentions of 12.6 dB, 13.49 dB, and 14.07 dB for severe, moderate, and linear nonlinearities, respectively. These achieved noise attenuation levels were superior to those of FxLMS by 583%, 610%, and 297.5%. The proposed CsNNet showed stable and robust performances for all types of construction noises with different levels of nonlinearity coming from loudspeaker effects. There was no significant decrease (i.e., only a 1.47 dB reduction (10%)) in the performance of the CsNNet, even though different levels of nonlinearities were applied.

The CsNNet-200 presented in Table 4, which can predict 200 samples ahead, was implemented to consider various time delays. Considering the various time delays, CsNNet-200 still showed superior performance in the noise attenuation levels compared to those of FxLMS with the three different nonlinearity levels. The CsNNet-200 average noise attenuation levels from the different nonlinearities were 8.16 dB, 8.26 dB, and 8.65 dB for severe, moderate, and linear nonlinearities, respectively. These noise attenuation levels are better than those of FxLMS by 378%, 375%, and 183%. It is worth mentioning that the FxLMS does not predict future anti-noise samples, since it is small and fast enough to produce anti-noise before reference noise reaches the error microphone location. This is true under the condition of choosing a small filter size for FxLMS. Otherwise, it might be impossible to realize FxLMS so that it respects causality constraints.

Figure 8:
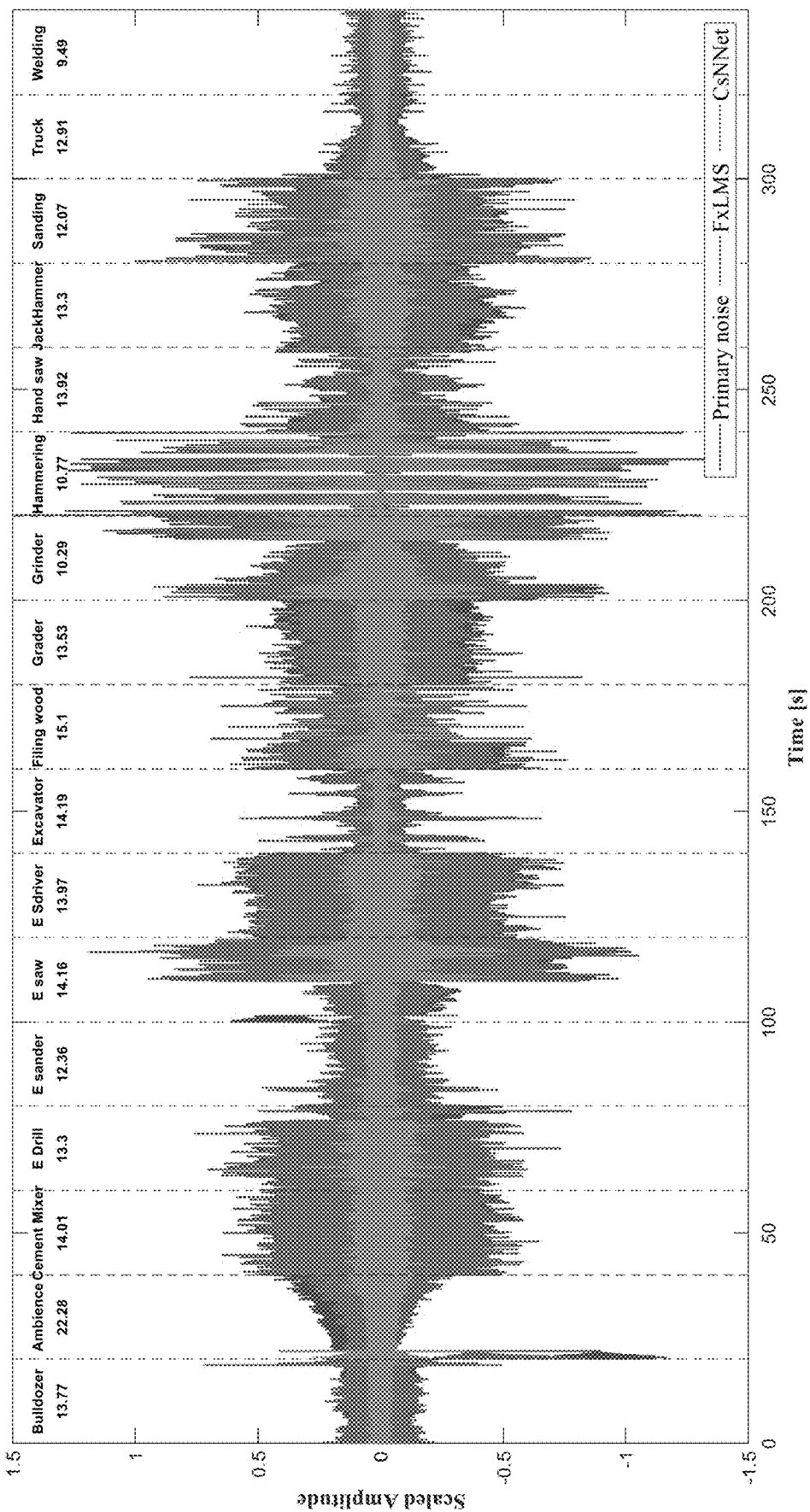
FIG. 8 is a waveform of primary and attenuated noise achieved by CsNNet with loudspeaker nonlinearity of $\eta^2=0.5$.
Figure 9:
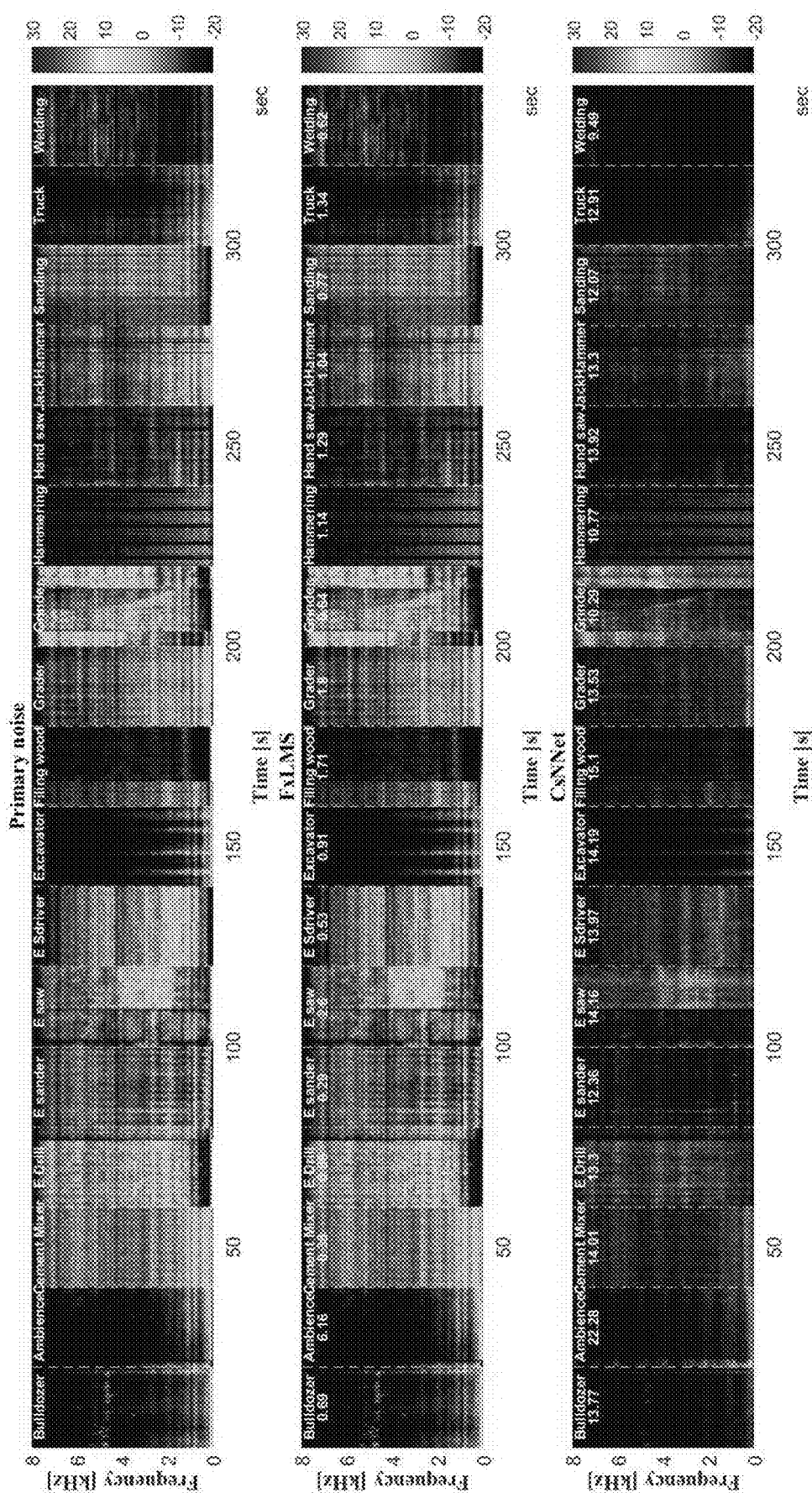
FIG. 9 are plots showing noise attenuation obtained by CsNNet with loudspeaker nonlinearity of $\eta^2=0.5$ in the time-frequency domain.

The performance of the CsNNet is illustrated in FIGS. 8 and 9. FIG. 8 shows the time histories of all 17 different construction site noises measured (blue line), the residual noises achieved by FxLMS (red line), and the residual noise obtained by CsNNet (green line) after cancelation for the moderate nonlinearity case, which is the most common level of nonlinearity. Although negligible noise attenuation is achieved by FxLMS, all 17 types of noise coming from construction sites were drastically reduced by the proposed CsNNet.

FIG. 9 shows the noise attenuation for each noise category achieved by CsNNet and FxLMS in the time-frequency domains when moderate loudspeaker nonlinearity is applied. In FIG. 9, the time-frequency plot drawn by the short-time Fourier transform (STFT) shows the ability of CsNNet to mitigate noise at different frequencies. The highest frequency shown in this plot is 8 kHz, which is half the sampling frequency based on the Nyquist sampling theorem. As can be seen, the frequency contents of the residual noises differ from those of primary noises by eliminating main low-frequency noises (e.g., bulldozer, ambiance, and truck), high-frequency noises (e.g., electric saw, sander, screwdriver, and grader machine noise), and nonstationary transient noises (e.g., filling wood, jackhammer, excavator, and hammering). The noise reduction value of each noise category in decibels calculated by Equation (15) is shown under the names of noises in FIGS. 8 and 9.

Figure 10:
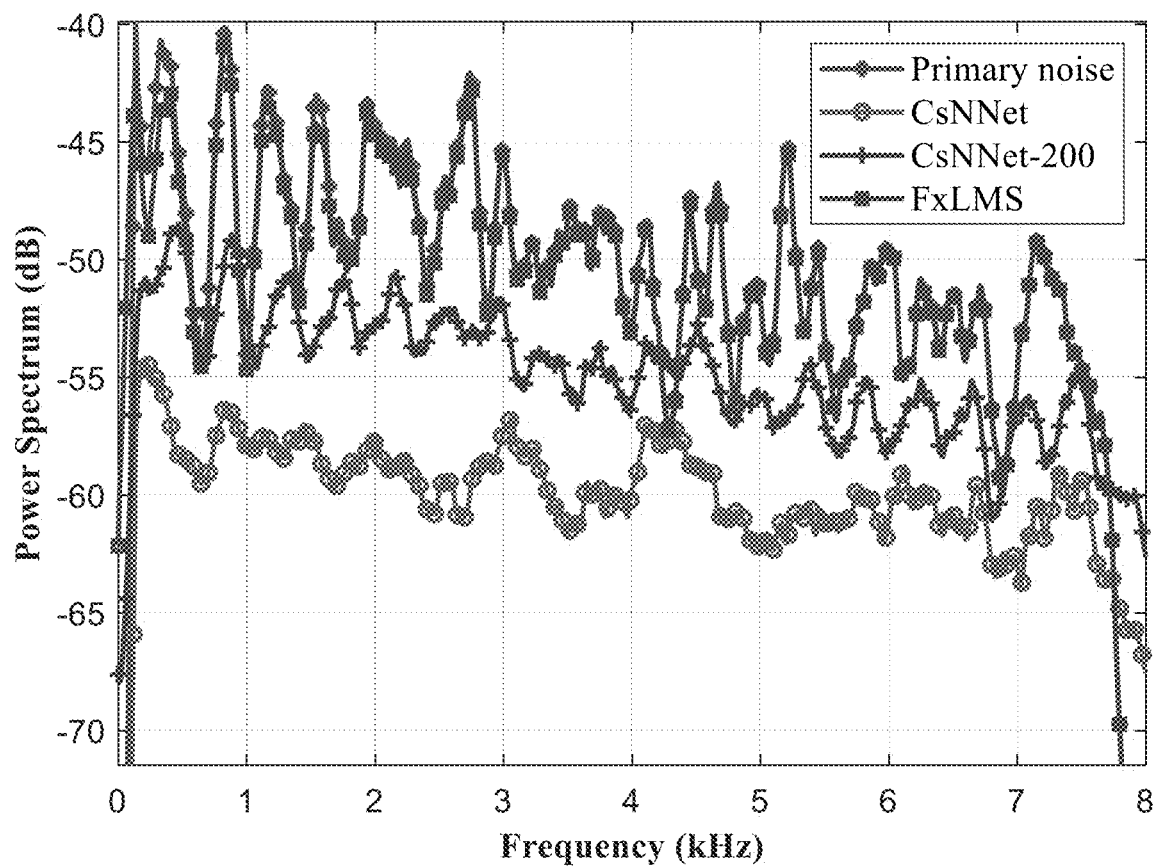
FIG. 10 is a graph showing power spectrum of primary noise and residual noise achieved by CsNNet, CsNNet-200, and FxLMS with loudspeaker nonlinearity $\eta^2=0.5$.

As additional information regarding the performance of the ANC algorithms, FIG. 10 demonstrates the power spectrum of primary and attenuated noise in dB achieved by CsNNet (without prediction), CsNNet-200 (with 200 samples of anti-noise prediction), and FxLMS with the presence of moderate nonlinearity of the loudspeaker. The power spectrum is the distribution of the energy of a waveform with respect to its different frequency components. While FxLMS could attenuate only a negligible portion of low-frequency noises, CsNNet and CsNNet-200 could consistently reduce the energy of noises up to around 8 KHz.

Furthermore, ANC methods are trained and tested using the various mixtures of noises presented in Table 3. Table 5 summarizes the noise reduction performance of ANC systems in these test scenarios. In the presence of multiple noisy activities, CsNNet still outperforms FxLMS by a significant gap, as shown in Table 5. The average noise attention levels of CsNNet are 10.88 dB, 11.10 dB, and 11.40 dB for severe, moderate, and linear nonlinearity considerations, respectively. The corresponding noise attention levels of FxLMS are 1.94 dB, 2.42 dB, and 2.55 dB. This means that CsNNet outperforms FxLMS by 561%, 459%, and 447% for the severe, moderate, and linear nonlinearity cases, respectively. The performance of the CsNNet-200 was also better than that of FxLMS by 360%, 304%, and 311%.

Figure 11:
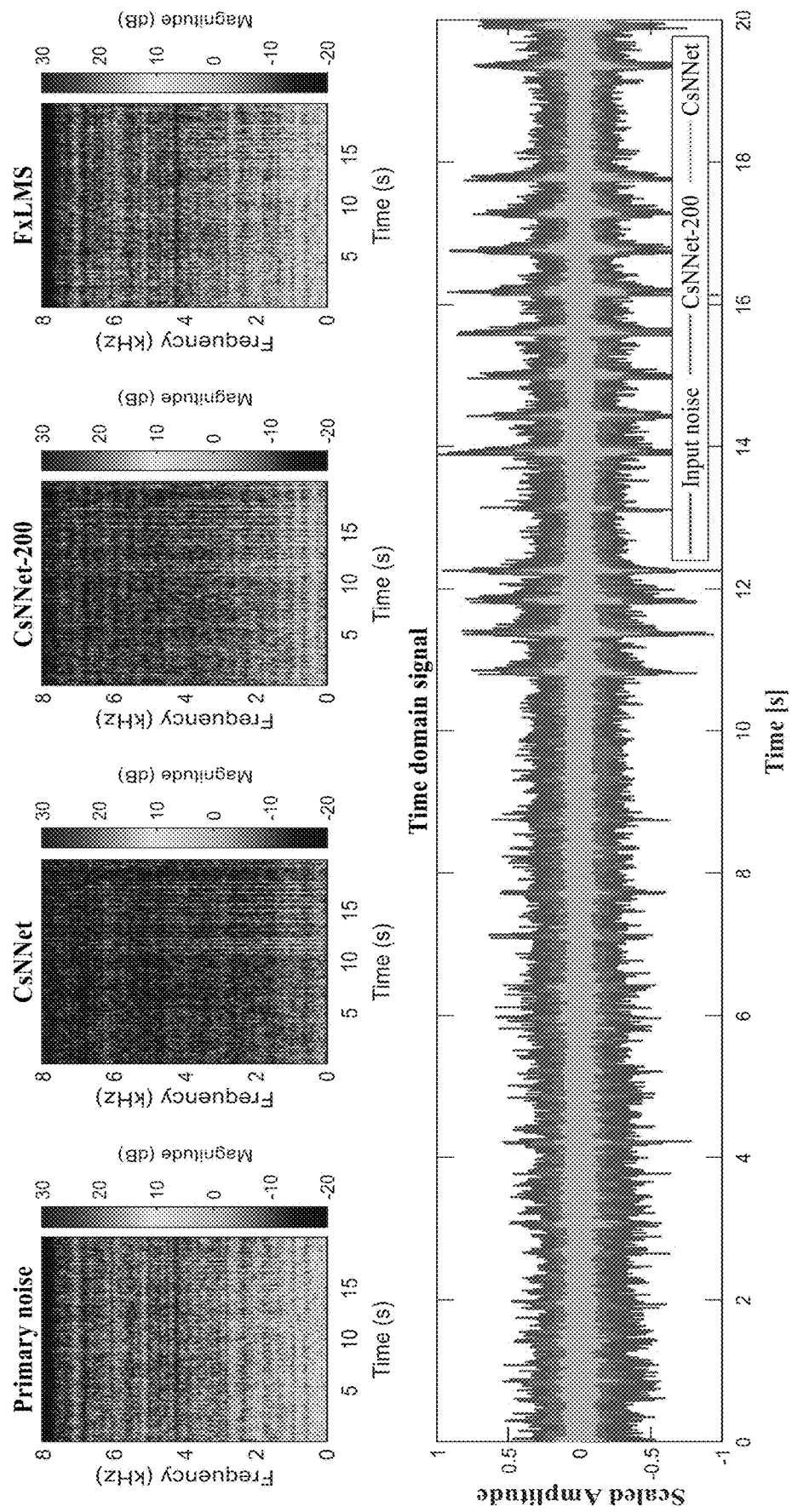
FIG. 11 shows active noise cancelation performance of the proposed algorithm for the MN1 dataset in time and time-frequency domains with loudspeaker nonlinearity of $\eta^2=0.5$.
Figure 12:
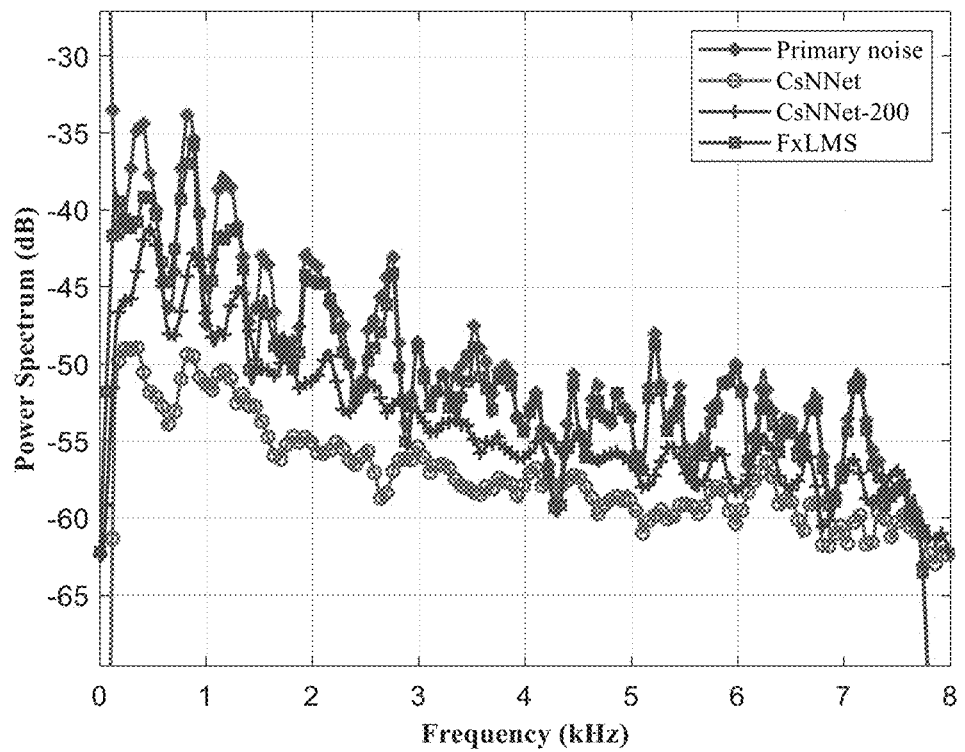
FIG. 12 is a graph showing power spectrum of reference and canceled noise of MN1 dataset with loudspeaker nonlinearity of $\eta^2=0.5$.

In addition, FIGS. 11 and 12 depict the performance of CsNNet and the comparative algorithm in canceling mixed noise data when nonlinearity of $\eta^2=0.5$ is applied in the secondary path, which is the most common scenario. Regarding the STFT plots in FIG. 11 and the power spectrum plot in FIG. 12, CsNNet and CsNNet-200 achieved broadband noise cancelation by mitigating high-frequency noises as well as low-frequency noises. However, FxLMS demonstrated only negligible noise cancelation of low-frequency noises. Here again, by predicting the anti-noise samples in advance, the performance of CsNNet decreased. This can also be seen by comparing the STFT drawing of CsNNet and CsNNet-200 in FIG. 11 and the residual noise energy achieved by CsNNet and CsNNet-200 in FIG. 12, where the remaining noise energy line of CsNNet-200 is higher than that of CsNNet.

The performance of CsNNet is compared with state-of-the-art ANC algorithms Deep-ANC [9] and THF-FxLMS [26]. THF-FxLMS is one of the FxLMS variants recently developed to deal with nonlinear ANC, and Deep-ANC is a deep convolutional recurrent neural network with around 9.07 million parameters. Deep-ANC was attempted to be trained with the applicant's construction dataset to compare the results with CsNNet. However, due to the huge network architecture of Deep-ANC, our construction noise dataset was not sufficient to train it, and the model was overfitted to the training data. For fair evaluation, Deep-ANC was compared with CsNNet using the same data on which Deep-ANC was primarily designed, optimized, trained, and tested, as discussed in [9]. The data contained the engine, factory, and babble noises [52] that were primarily sampled at 19.98 kHz with 16-bit resolution, and it was down-sampled to 16 KHz. The same simulation procedure described in Deep-ANC [9] is used for a fair comparison. Microphones and loudspeaker locations were set as shown in FIG. 6, which is the same as explained in Deep-ANC [9], and 0.2 s reverberation time was utilized to test networks.

Deep-ANC is a frequency domain ANC method since it uses a real and imaginary spectrogram of the STFT of reference noise as input. Frequency-domain ANC algorithms introduce an extra delay (rather than a processing delay) to the ANC system equal to the frame length of STFT [53], so 20 ms of anti-noise samples was predicted by Deep-ANC to tackle this delay. Deep-ANC was trained with data sampled at 16 kHz, so 20 ms predictions are equal to 320 sample points. For this reason, this network is referred to as Deep-ANC-320. However, they also considered the processing delay of their model with 9.07 M parameters to respect the causality constraint, but they did not. Overall, it is reasonable to compare "Deep-ANC" with "CsNNet" and "Deep-ANC-320" with "CsNNet-200," as shown in Table 6. The numbers in Table 6 for FxLMS, THF-FxLMS, Deep-ANC, and Deep-ANC-320 are acquired from [9].

Table 5 compares the noise attenuation achievements of CsNNet and comparative algorithms. In Table 6, it can be seen that FxLMS showed good performance in the linear ANC system, but its ability to cancel noise degraded when facing nonlinear ANC. THF-FxLMS could model nonlinearity in the secondary path and attenuate noise when severe nonlinearity existed in the secondary path. Although both Deep-ANC and CsNNet outperformed FxLMS and THF-FxLMS in both linear and nonlinear cases, CsNNet was superior to all algorithms. When it comes to respecting causality constraints by predicting future canceling signals, CsNNet-200 performed by around 109%, 184%, and 132% better than Deep-ANC-320, and approximately 129%, 218%, and 154% better than THF-FxLMS in the case of moderate nonlinearity for engine, factory, and babble noises, respectively.

CsNNet for Multi-Channel ANC

CsNNet is shown to surpass traditional as well as recently developed state-of-the-art ANC algorithms (Deep-ANC, Deep-ANC-320, and THF-FxLMS) as a single-channel ANC method in various noisy environments. As such, CsNNet is extended to produce multiple anti-noise signals for multiple loudspeakers simultaneously without increasing computational costs. A typical multi-channel ANC (MCANC) comprises J canceling loudspeakers, I reference, and K error microphones, respectively. Conventional adaptive algorithms like FxLMS have also been extended for MCANC [18,21]. Recently, multiple adaptive FIR filters followed by adaptive spline activation functions have been developed for nonlinear spatial MCANC [54]. In these adaptive-based methods, each loudspeaker is provided with a separate controller signal, which results in I×J controllers. As a result, computational complexity grows by increasing the number of adaptive FIR controllers [54]. Many attempts have been made to reduce the exponentially growing computational cost of MCANC adaptive-based algorithms [55], but this reduction in computation costs results in decreased noise attenuation performance [55]. This is mainly because conventional ANC algorithms cannot predict future canceling noise samples, so they are forced to work with a smaller number of parameters to meet the causality criteria.

The MCANC problem is investigated with one reference microphone, one error microphone, and three loudspeakers. As such, the final PW convolution was removed, and the number of output channels of the final decoder unit was reduced from 4 to 3. Therefore, the new model produces three channels instead of one channel with an equal length of the input data. This modification resulted in dropping the number of parameters from 128,500 to 128,441. Furthermore, to produce RIRs for the primary and secondary paths, the microphones were located the same as in FIG. 6, and three canceling loudspeakers were placed at [1 m, 2.5 m, 1 m], [1.5 m, 2.5 m, 1 m], [2 m, 2.5 m, 1 m. The error noise signal for this scenario can be calculated using Equation (16).

$$e(t) = x(t) * P(z) - \sum_{j=1}^{M} f_{SEF}\{CsNNet(x(t))_j\} * S_j(z) \quad (16)$$

Figure 13:
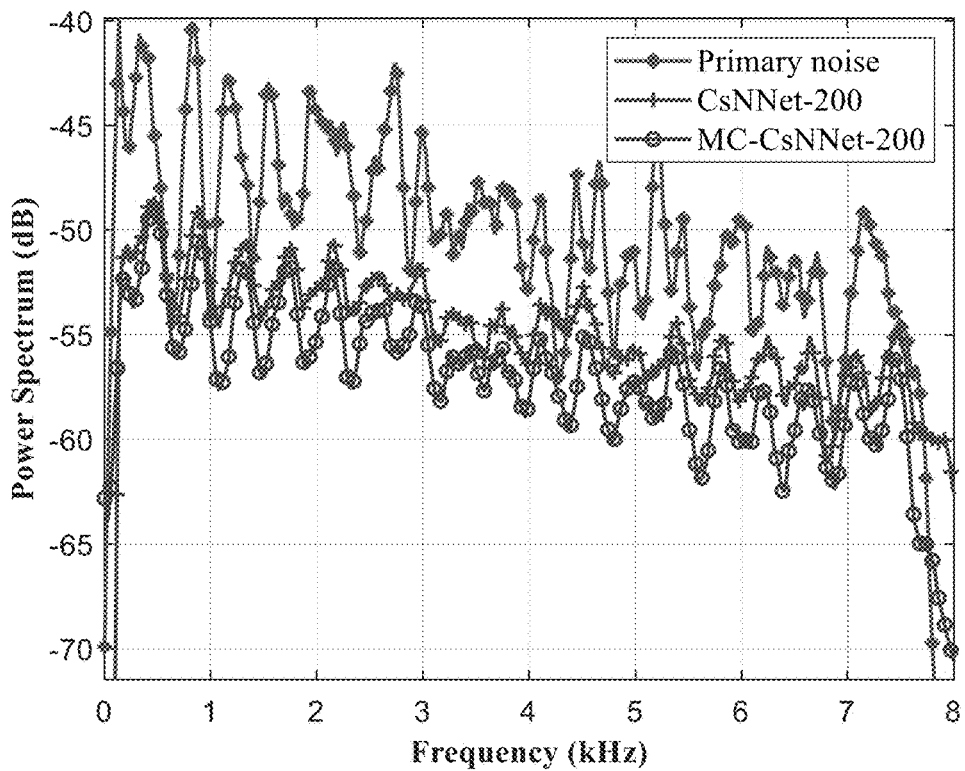
FIG. 13 is a graph comparing single channel and MCANC of CsNNet for 17 construction noise types and moderate loudspeaker nonlinearity.

In this equation, $S_j(z)$ is the $j^{th}$ secondary path simulated for M loudspeaker and $CsNNet(x(t))_j$ is the anti-noise signal generated for the corresponding $j^{th}$ loudspeaker by feeding reference noise x(t) to the CsNNet. To train the model to generate M anti-noise signals, the loss function should be modified to:

$$MSE = \frac{1}{B}\sum_{k=0}^{B}\sum_{j=1}^{M}(\hat{a}_j(k) - a_j(k))^2 \quad (17)$$

where $\hat{a}_j$ and $a_j$ represent ideal and predicted canceling signals for each loudspeaker, respectively. As illustrated in FIG. 13, MCANC consistently outperformed single-channel CsNNet-200, and the network's ability to cancel noise of all frequencies improved. This resulted in the improvement of noise attenuation levels by around 121% from 8.28 dB to 10.02 dB when moderate nonlinearity of the loudspeaker was used, as shown in Table 7. Further investigation of the MCANC of CsNNet will be performed in future studies.

CONCLUSIONS

In this research, a deep learning-based ANC named CsNNet was developed to mitigate various construction site noises as a feedforward controller with nonlinear disturbances, including time delays. Newly designed encoder and decoder units were incorporated with LSTM and a channel attention module with skipped connections to extract effective and robust features from the minimum possible samples of the reference noise, with a minimal number of trainable parameters, thus decreasing computational complexity. Powerful LSTM units were employed to use multilevel features extracted by encoders to mitigate impulsive construction noises and predict future canceling signals, satisfying causality constraints. Attention mechanisms were integrated to exploit the extracted feature maps of encoders and intelligently select and concatenate them with the decoders' features to generate accurate anti-noise signals. CsNNet showed state-of-the-art performance in canceling all 17 construction noises, including impulsive and low- and high-frequency noises, by considering the inherent nonlinearities and constraints of ANC systems. Its achievements are as follows:

1) New encoders and decoders comprise atrous and depthwise separable convolutions to exploit small input to the CsNNet, decreasing computational costs and respecting strict ANC latency constraints.

2) The CsNNet realized a single sensor-based ANC using only a primary noise sensor and a loudspeaker. Thus, it was able to perform the ANC operation without retuning parameters.

3) Nonlinearity of primary and secondary paths was modeled, including sound reverberations and loudspeaker nonlinearity.

4) To demonstrate the real-time processing capability of the CsNNet, strict ANC causality constraints in a worst-case scenario were satisfied through processing time calculations and 12.5 ms predictions of future noise samples.

5) Seventeen types of noise on construction sites were investigated, including low- and high-frequency and transient impulse-like noises, with different loudspeaker nonlinear distortions.

6) In a normal single type of construction noise, the proposed single-channel CsNNet could attenuate broadband construction noises up to 8.16 dB for severe nonlinearity and 8.28 dB for moderate nonlinearity of the loudspeaker, performing 378% and 375% better than FxLMS, respectively.

7) CsNNet-200 achieved around 7 dB and 7.35 dB noise attenuation on mixed noise cases for harsh and moderate nonlinearities, outperforming the traditional method by approximately 360% and 304%, respectively.

8) CsNNet-200 also outperformed the recently developed state-of-the-art ANC algorithm, Deep-ANC-320, in canceling engine, factory, and babble noises by approximately 109%, 184%, and 132% in the presence of moderate loudspeaker nonlinearity.

9) Unlike conventional ANC methods, it has been shown that CsNNet can be easily expanded to the MCANC algorithm without resulting in increases in computational costs.

10) It was shown that the construction noise attenuation level of CsNNet-200 can be improved by around 121% by expanding it to the MCANC algorithm and using three loudspeakers without increasing computational costs.

In another arrangement, this network (CsNNet) may be configured to selectively attenuate only noise in noisy speech environments.

As described hereinbefore, the present invention relates to a computer-implemented method for generating anti-noise using an anti-noise generator to suppress noise from a noise source in an environment. The computer-implemented method comprises the generally steps of:
    receiving a sound signal representative of ambient sound in the environment including the noise from the noise source and the anti-noise from the anti-noise generator;
    processing the sound signal using a deep learning algorithm configured to generate an anti-noise signal to form anti-noise; and
    outputting the anti-noise signal to the anti-noise generator.
The ambient sound generally also includes propagation noise from the environment.

The deep learning algorithm, which is used to process the sound signal for generating the anti-noise signal, comprises:
an encoder module having a plurality of atrous separable convolutions and a plurality of depthwise separable convolutions and being configured to receive the sound signal and to perform feature extraction to form a feature map, the encoder module being iterated so as to have plural iterations thereof and thereby forming a plurality of feature maps;
an attention module configured to receive the feature maps of the plural iterations of the encoder module and to generate plural attention maps respectively based thereon;
a recurrent neural network having plural layers of long short-term memory type and configured to receive the feature map of a final one of the iterations of the encoder module, the recurrent neural network being configured to predict a future portion of the sound signal and to model temporal features of the feature map of the final iteration of the encoder module; and
a decoder module having a plurality of transposed atrous separable convolutions and a transposed depthwise separable convolution and being configured to receive an output of the recurrent neural network and the attention maps from the attention module, the decoder module being configured to map the output of the recurrent neural network to the anti-noise signal having common dimensions as the sound signal, and the decoder module being iterated so as to have plural iterations thereof.

Generally speaking, the encoder module is configured to output one or more feature maps. Since the encoder module is iterated and is connected to both the attention module and the recurrent neural network (RNN) downstream thereto, the attention module receives different output corresponding to the feature maps of all of the iterations of the encoder module and the RNN receives a single one of the feature maps corresponding to the final iteration.

In other words, the recurrent neural network (RNN) having plural layers of long short-term memory type is a stacked long short-term memory network.

The RNN of long short-term memory (LSTM) type acts to predict anti-noise to tackle the causality constraint.

This deep learning algorithm is substantially suitable for one or multi-channel inputs, where each channel is represented by a distinct audio sensor.

Typically, the audio sensor is in the form of a microphone.

It will be appreciated that convolutions of depthwise type (for example, depthwise separable convolution or transposed depthwise separable convolution) act to reduce computational cost and to address or respect the causality constraint.

In the illustrated arrangement, the sound signal is captured by a single audio sensor configured to capture sound, and the deep learning algorithm further comprises a pointwise convolution after the decoder module and configured to receive an output thereof.

In the illustrated arrangement, the encoder module comprises:
an input layer configured to form an output thereof the same as an input thereto;
a first depthwise separable convolution configured to receive the output of the input layer of the encoder module;
a first atrous separable convolution having a first dilation rate and configured to receive the output of the input layer of the encoder module;
a second atrous separable convolution having a second dilation rate different than the first dilation rate and configured to receive the output of the input layer of the encoder module; and
a second depthwise separable convolution receiving as input thereto concatenated outputs of the first depthwise separable convolution and the first and second atrous separable convolutions and forming an output of a respective one of the iterations of the encoder module.

Furthermore, the encoder module is characterized in that:
for a first one of the iterations of the encoder module, the input of the input layer is the sound signal; and
for subsequent iterations of the encoder module after the first iteration thereof, the input of the input layer is the output of the second depthwise separable convolution; and
the outputs of the encoder module comprise the outputs of the second depthwise separable convolution of the iterations of the encoder module.

Thus, the feature map of each subsequent iteration is based on the feature map of the preceding iteration.

In the illustrated arrangement, the encoder module is iterated four times.

In the illustrated arrangement, the second dilation rate is twice the first dilation rate. More specifically, in the illustrated arrangement, the first dilation rate is two and the second dilation rate is four.

In the illustrated arrangement, final depthwise convolutions of each of the depthwise separable convolutions and the atrous separable convolutions are followed by a parametric rectified linear unit activation function.

In the illustrated arrangement, the decoder module comprises:
an input layer having a first concatenated portion and a second concatenated portion which are concatenated to form an output of the input layer of the decoder module, the input layer being characterized in that:
in a first one of the iterations of the decoder module, the first concatenated portion of the input layer is the output of the recurrent neural network and in each subsequent one of the iterations after the first iteration, the first concatenated portion is the output of a preceding one of the iterations of the decoder module,
the second concatenated portion is a respective one of the attention maps of the attention module;
a first transposed atrous separable convolution having a first dilation rate and configured to receive an output of the input layer of the decoder module;
the transposed depthwise separable convolution being configured to receive the output of the input layer of the decoder module;
a second transposed atrous separable convolution having a second dilation rate different than the first dilation rate of the first transposed atrous separable convolution and configured to receive the output of the input layer of the decoder module; and
an output layer configured to form an output of the decoder module in the form of a summation of outputs of the first and second transposed atrous separable convolutions and the transposed depthwise separable convolution.

The output is based on the outputs of the preceding convolutions of a common one of the iterations of the decoder module.

More specifically, in each one of the iterations of the decoder module, the second concatenated input portion is a different one of the attention maps corresponding to a respective one of the feature maps of the plural iterations of the encoder module. Typically, the second concatenated portion corresponds to the attention map of a corresponding iteration of the attention module.

In the illustrated arrangement, the decoder module is iterated four times.

In the illustrated arrangement, the second dilation rate of the second transposed atrous separable convolution is twice the first dilation rate of the first transposed atrous separable convolution. More specifically, in the illustrated arrangement, the first dilation rate of the first transposed atrous separable convolution is two and the second dilation rate of the second transposed atrous separable convolution is four.

As described hereinbefore, and in other words, the present invention relates to a computer-implemented method for generating anti-noise to suppress noise, which comprises steps of receiving a sound signal representative of ambient sound including noise from a noise source, anti-noise from an anti-noise generator, and propagation noise from environment; processing the sound signal using a deep learning algorithm configured to generate an anti-noise signal to form anti-noise; and outputting the anti-noise signal to the anti-noise generator. The deep learning algorithm features an encoder module with atrous separable convolutions and depthwise separable convolutions and configured to perform feature extraction on the sound signal iteratively to form plural feature maps; an attention module configured to receive the feature maps of the iterations of the encoder module and to generate plural attention maps respectively based thereon; a recurrent neural network (RNN) having long short-term memory type layers and configured to receive the feature map of a final iteration of the encoder module and being configured to predict a future portion of the sound signal and to model temporal features of the feature map of the final iteration of the encoder module; and an iterative decoder module with transposed atrous separable convolutions and a transposed depthwise separable convolution and configured to receive an output of the RNN and the attention maps from the attention module, and to map the output of the RNN to the anti-noise signal having common dimensions as the sound signal.

The scope of the claims should not be limited by the preferred embodiments set forth in the examples but should be given the broadest interpretation consistent with the specification as a whole.

REFERENCES

[1] S. A. Stansfeld, M. P. Matheson, Noise pollution: Non-auditory effects on health, Br Med Bull. 68 (2003). https://doi.org/10.1093/bmb/ldg033.
[2] S. Gupta, C. Ghatak, Environmental noise assessment and its effect on human health in an urban area, Int J Environ Sci. 1. 7 (2011).
[3] WorkSafe bulletin, how loud is it?—construction, (n.d.). https://www.worksafebc.com/resources/health-safety/hazard-alerts/how-loud-is-it-construction?lang-en&direct (accessed Mar. 26, 2022).
[4] A. Gilchrist, E. N. Allouche, D. Cowan, Prediction and mitigation of construction noise in an urban environment, Canadian Journal of Civil Engineering. 30 (2003). https://doi.org/10.1139/103-019.
[5] H. M. H. P. Lee, Z. Wang, K. M. Lim, H. M. H. P. Lee, A Review of Active Noise Control Applications on Noise Barrier in Three-Dimensional/Open Space: Myths and Challenges, Fluctuation and Noise Letters. 18 (2019). https://doi.org/10.1142/S0219477519300027.
[6] L. Wang, P. Guo, A Simplified Method to Calculate the Acoustic Pressure of Three-Dimensional Finite-Length Noise Barriers, Journal of Highway and Transportation Research and Development (English Edition). 7 (2013). https://doi.org/10.1061/jhtrcq.0000339.
[7] M. H. F. de Salis, D. J. Oldham, S. Sharples, Noise control strategies for naturally ventilated buildings, Build Environ. 37 (2002). https://doi.org/10.1016/S0360-1323(01)00047-6.
[8] N. Kwon, M. Park, H.-S. Lee, J. Ahn, M. Shin, Construction Noise Management Using Active Noise Control Techniques, J Constr Eng Manag. 142 (2016). https://doi.org/10.1061/(asce)co.1943-7862.0001121.
[9] H. Zhang, D. L. Wang, Deep ANC: A deep learning approach to active noise control, Neural Networks. 141 (2021). https://doi.org/10.1016/j.neunet.2021.03.037.
[10] S. Park, E. Patterson, C. Baum, Long short-term memory and convolutional neural networks for active noise control, in: 2019 5th International Conference on Frontiers of Signal Processing, ICFSP 2019, 2019. https://doi.org/10.1109/ICFSP48124.2019.8938042.
[11] S. Sohrabi, T. P. Gómez, J. R. Garbí, Suitability of Active Noise Barriers for Construction Sites, Applied Sciences (Switzerland). 10 (2020). https://doi.org/10.3390/app10186160.
[12] INC Engineering Co Ltd, Super Noise Barrier, 2007 in Japanese, (2022). https://www.ihi.co.jp/inc/laneng/catalog/pdf/ace.pdf (accessed May 7, 2022).
[13] Google Street View, Image Capture of Route 43, 2019. Nishihonmachi, Amagasaki, Hyogo, Japan, (2022). https://goo.gl/maps/NoYK8DYAjrZRa9F59 (accessed May 7, 2022).
[14] L. Y. L. Ang, Y. K. Koh, H. P. Lee, The performance of active noise-canceling headphones in different noise environments, Applied Acoustics. 122 (2017). https://doi.org/10.1016/j.apacoust.2017.02.005.
[15] P. N. Samarasinghe, W. Zhang, T. D. Abhayapala, Recent Advances in Active Noise Control Inside Automobile Cabins: Toward quieter cars, IEEE Signal Process Mag. 33 (2016). https://doi.org/10.1109/MSP.2016.2601942.
[16] C. D. Kestell, S. Australia, Active control of sound in a small single engine aircraft cabin with virtual error sensors, Mechanical Engineering On. (2000). https://hekyll.services.adelaide.edu.au/dspace/handle/2440/37700 (accessed Aug. 25, 2022).
[17] B. Lam, W. S. Gan, D. Y. Shi, M. Nishimura, S. Elliott, Ten questions concerning active noise control in the built environment, Build Environ. 200 (2021). https://doi.org/10.1016/j.buildenv.2021.107928.
[18] S. M. Kuo, D. R. Morgan, Active noise control: a tutorial review, Proceedings of the IEEE. 87 (1999). https://doi.org/10.1109/5.763310.
[19] R. Kukde, M. S. Manikandan, G. Panda, Incremental Learning Based Adaptive Filter for Nonlinear Distributed Active Noise Control System, IEEE Open Journal of Signal Processing. 1 (2020). https://doi.org/10.1109/ojsp.2020.2975768.
[20] M. H. Costa, J. C. M. Bermudez, N. J. Bershad, Stochastic analysis of the filtered-X LMS algorithm in systems with nonlinear secondary paths, IEEE Transactions on Signal Processing. 50 (2002). https://doi.org/10.1109/TSP.2002.1003058.
[21] S. M. Kuo, D. R. Morgan, Active Noise Control Systems Algorithms and DSP Implementations, A Wiley- Interscience Publication, New York•Chichester•Brisbane•Toronto•Singapore, 1996.
[22] Elias Bjarnason, Analysis of the Filtered-X LMS Algorithm, IEEE Transactions on Speech and Audio Processing. (1995).
[23] O. J. Tobias, R. Seara, Leaky-FXLMS algorithm: Stochastic analysis for Gaussian data and secondary path modeling error, IEEE Transactions on Speech and Audio Processing. 13 (2005). https://doi.org/10.1109/TSA.2005.852018.
[24] D. P. Das, G. Panda, Active mitigation of nonlinear noise processes using a novel filtered-s LMS algorithm, IEEE Transactions on Speech and Audio Processing. 12 (2004). https://doi.org/10.1109/TSA.2003.822741.
[25] S. M. Kuo, H. T. Wu, Nonlinear adaptive bilinear filters for active noise control systems, IEEE Transactions on Circuits and Systems I: Regular Papers. 52 (2005). https://doi.org/10.1109/TCSI.2004.842429.
[26] S. Ghasemi, R. Kamil, M. H. Marhaban, Nonlinear Thf-Fxlms Algorithm for Active Noise Control with Loudspeaker Nonlinearity, Asian J Control. 18 (2016). https://doi.org/10.1002/asjc.1140.
[27] S. D. Snyder, N. Tanaka, Active Control of Vibration Using a Neural Network, IEEE Trans Neural Netw. 6 (1995). https://doi.org/10.1109/72.392246.
[28] C. K. Chen, T. D. Chiueh, Multilayer perceptron neural networks for active noise cancellation, in: Proceedings—IEEE International Symposium on Circuits and Systems, 1996. https://doi.org/10.1109/iscas.1996.541648.
[29] K. Na, S. I. Chae, Single-sensor active noise cancellation using recurrent neural network predictors, in: IEEE International Conference on Neural Networks—Conference Proceedings, 1997. https://doi.org/10.1109/ICNN.1997.614239.
[30] R. Ali, Y. J. Cha, Attention-based generative adversarial network with internal damage segmentation using thermography, Autom Constr. 141 (2022) 104412. https://doi.org/10.1016/J.AUTCON.2022.104412.
[31] Y. J. Cha, W. Choi, O. B.-C. C. and, undefined 2017, O. B.-C. Civil, and undefined 2017, Deep learning-based crack damage detection using convolutional neural networks, Wiley Online Library. 32 (2017) 361-378. https://doi.org/10.1111/mice.12263.
[32] K. Tan, D. Wang, Complex Spectral Mapping with a Convolutional Recurrent Network for Monaural Speech Enhancement, ICASSP, IEEE International Conference on Acoustics, Speech and Signal Processing—Proceedings. 2019-May (2019) 6865-6869. https://doi.org/10.1109/ICASSP.2019.8682834.
[33] X. Kong, S. M. Kuo, Study of causality constraint on feedforward active noise control systems, IEEE Transactions on Circuits and Systems II: Analog and Digital Signal Processing. 46 (1999) 183-186. https://doi.org/10.1109/82.752950.
[34] L. Zhang, X. Qiu, Causality study on a feedforward active noise control headset with different noise coming directions in free field, Applied Acoustics. 80 (2014). https://doi.org/10.1016/j.apacoust.2014.01.004.
[35] K. He, X. Zhang, S. Ren, J. Sun, Deep residual learning for image recognition, in: Proceedings of the IEEE Computer Society Conference on Computer Vision and Pattern Recognition, 2016. https://doi.org/10.1109/CVPR.2016.90.
[36] R. Giri, U. Isik, A. Krishnaswamy, Attention Wave-U-Net for speech enhancement, in: IEEE Workshop on Applications of Signal Processing to Audio and Acoustics, 2019. https://doi.org/10.1109/WASPAA.2019.8937186.
[37] D. Stoller, S. Ewert, S. Dixon, Wave-U-Net: A multi-scale neural network for end-to-end audio source separation, in: Proceedings of the 19th International Society for Music Information Retrieval Conference, ISMIR 2018, 2018.
[38] Y. Luo, N. Mesgarani, Conv-TasNet: Surpassing Ideal Time-Frequency Magnitude Masking for Speech Separation, IEEE/ACM Trans Audio Speech Lang Process. 27 (2019). https://doi.org/10.1109/TASLP.2019.2915167.
[39] L. C. Chen, Y. Zhu, G. Papandreou, F. Schroff, H. Adam, Encoder-decoder with atrous separable convolution for semantic image segmentation, in: Lecture Notes in Computer Science (Including Subseries Lecture Notes in Artificial Intelligence and Lecture Notes in Bioinformatics), 2018. https://doi.org/10.1007/978-3-030-01234-2_49.
[40] K. He, X. Zhang, S. Ren, J. S.-P. of the IEEE, undefined 2015, Delving deep into rectifiers: Surpassing human-level performance on imagenet classification, Openaccess. Thecvf.Com. (n.d.). http://openaccess.thecvf.com/content_iccv_2015/html/He_Delving_Deep_into_ICCV_2015_paper.html (accessed Sep. 5, 2022).
[41] S. Ioffe, C. Szegedy, Batch normalization: Accelerating deep network training by reducing internal covariate shift, in: 32nd International Conference on Machine Learning, ICML 2015, 2015.
[42] S. Woo, J. Park, . . . J. L.-P. of the, undefined 2018, Cbam: Convolutional block attention module, Openaccess. Thecvf.Com. (n.d.). http://openaccess.thecvf.com/content_ECCV_2018/html/Sanghyun_Woo_Convolutional_Block_Attention_ECCV_2018_paper.html (accessed Sep. 5, 2022).
[43] S. Hochreiter, J. Schmidhuber, Long Short Term Memory. Neural Computation, Neural Comput. 9 (1997).
[44] D. P. Kingma, J. L. Ba, Adam: A method for stochastic optimization, in: 3rd International Conference on Learning Representations, ICLR 2015—Conference Track Proceedings, 2015.
[45] Sound Effects Libraries Categories|Sound Ideas, (n.d.). https://www.sound-ideas.com/ (accessed Sep. 5, 2022).
[46] J. B. Allen, D. A. Berkley, Image method for efficiently simulating small-room acoustics, Journal of the Acoustical Society of America. 65 (1979). https://doi.org/10.1121/1.382599.
[47] P. N. Samarasinghe, W. Zhang, T. D. Abhayapala, Recent Advances in Active Noise Control Inside Automobile Cabins: Toward quieter cars, IEEE Signal Process Mag. 33 (2016). https://doi.org/10.1109/MSP.2016.2601942.
[48] J. Cheer, Active control of the acoustic environment in an automobile cabin, University of Southampton. 20 (2012).
[49] Reverberation Time—an overview ScienceDirect Topics, (n.d.). https://www.sciencedirect.com/topics/mathematics/reverberation-time (accessed May 9, 2022).
[50] O. J. Tobias, R. Seara, On the LMS algorithm with constant and variable leakage factor in a nonlinear environment, IEEE Transactions on Signal Processing. 54 (2006). https://doi.org/10.1109/TSP.2006.879274.
[51] M. Salmasi, H. Mahdavi-Nasab, H. Pourghassem, Comparison of feed-forward and recurrent neural networks in active cancellation of sound noise, in: Proceed-

[52] A. Varga, H. J. M. Steeneken, Assessment for automatic speech recognition: II. NOISEX-92: A database and an experiment to study the effect of additive noise on speech recognition systems, Speech Commun. 12 (1993) 247-251. https://doi.org/10.1016/0167-6393(93)90095-3.
[53] F. Yang, Y. Cao, M. Wu, F. Albu, J. Yang, Frequency-domain filtered-x LMS algorithms for active noise control: A review and new insights, Applied Sciences (Switzerland). 8 (2018). https://doi.org/10.3390/app8112313.
[54] V. Patel, N. v. George, Multi-channel spline adaptive filters for non-linear active noise control, Applied Acoustics. 161 (2020) 107142. https://doi.org/10.1016/J.APACOUST.2019.107142.
[55] D. Shi, B. Lam, W. S. Gan, S. Wen, Block coordinate descent based algorithm for computational complexity reduction in multichannel active noise control system, Mech Syst Signal Process. 151 (2021). https://doi.org/10.1016/J.YMSSP.2020.107346.

Tables

TABLE 1

Input size, output size, and hyperparameters of CsNNet layers.

| Layer name | Input size (C, L) | Output size (C, L) | Hyperparameters |
|---|---|---|---|
| Encoder unit 1 | (1, L) | (8, L/2) | 1 × 16 |
| Encoder unit 2 | (8, L/2) | (16, L/4) | 1 × 16 |
| Encoder unit 3 | (16, L/4) | (16, L/4) | 1 × 16 |
| Encoder unit 4 | (32, L/8) | (64, L/16) | 1 × 16 |
| LSTM | (64, L/16) | (64, L/16) | 64 |
| Decoder unit 1 | (128, L/16) | (32, L/8) | 1 × 8 |
| Decoder unit 2 | (64, L/8) | (16, L/4) | 1 × 8 |
| Decoder unit 3 | (32, L/4) | (8, L/2) | 1 × 8 |
| Decoder unit 4 | (16, L/2) | (4, L) | 1 × 8 |
| Final PW Conv | (4, L) | (1, L) | 1 × 1 |

TABLE 2

Training and test data.

| | Noise type | Sampling frequency | Train duration (s) | Test duration (s) |
|---|---|---|---|---|
| 1 | Bulldozer | 16 & 48 kHz | 60 | 20 |
| 2 | Ambience | 16 & 48 kHz | 60 | 20 |
| 3 | Cement mixer | 16 & 48 kHz | 60 | 20 |
| 4 | Electric drill | 16 & 48 kHz | 60 | 20 |
| 5 | Electric sander | 16 & 48 kHz | 60 | 20 |
| 6 | Electric saw | 16 & 48 kHz | 60 | 20 |
| 7 | Electric screwdriver | 16 & 48 kHz | 60 | 20 |
| 8 | Excavator | 16 & 48 kHz | 60 | 20 |
| 9 | Filing wood | 16 & 48 kHz | 60 | 20 |
| 10 | Grader | 16 & 48 kHz | 60 | 20 |
| 11 | Grinder | 16 & 48 kHz | 60 | 20 |
| 12 | Hammering | 16 & 48 kHz | 60 | 20 |
| 13 | Hand saw | 16 & 48 kHz | 60 | 20 |
| 14 | Jackhammer | 16 & 48 kHz | 60 | 20 |
| 15 | Sanding | 16 & 48 kHz | 60 | 20 |
| 16 | Truck | 16 & 48 kHz | 60 | 20 |
| 17 | Welding | 16 & 48 kHz | 60 | 20 |
| | Total duration | | 1020 s = 17 min | 340 s |

TABLE 3

Mixtures of different construction activities/machinery noises.

| Data name | Noise type |
|---|---|
| MN1 | Bulldozer + grader machine + cement mixer + excavator + filling wood + hammering |
| MN2 | Construction truck and ambiance + electric drills and screwdrivers + grinder + sanding |
| MN3 | Hand saw + hydraulic jackhammer + electric sander + saw machine + welding |

TABLE 4

Noise attenuation achieved by CsNNet, CsNNet-200, and FxLMS.

| | Nonlinearity | | | | | | | | |
|---|---|---|---|---|---|---|---|---|---|
| | $\eta^2 = 0.1$ (Severe) | | | $\eta^2 = 0.5$ (Moderate) | | | $\eta^2 = \inf$ (Linear) | | |
| | CsNNet | CsNNet-200 | FxLMS | CsNNet | CsNNet-200 | FxLMS | CsNNet | CsNNet-200 | FxLMS |
| Bulldozer | 13.62 | 10.44 | 5.13 | 13.77 | 10.16 | 5.10 | 14.78 | 10.11 | 3.04 |
| Ambience | 21.28 | 20.09 | 19.52 | 22.28 | 20.68 | 19.71 | 23.49 | 21.65 | 13.31 |
| Cement mixer | 13.48 | 6.94 | 0.15 | 14.01 | 6.94 | 0.18 | 14.56 | 7.52 | 2.67 |
| Electric drill | 12.56 | 7.41 | 0.74 | 13.3 | 7.62 | 0.74 | 13.11 | 7.92 | 2.17 |
| Electric sander | 12.59 | 7.40 | 0.25 | 12.36 | 7.58 | 0.26 | 12.38 | 7.45 | 2.28 |
| Electric saw | 12.24 | 8.46 | 2.32 | 14.16 | 8.4 | 2.32 | 14.85 | 9.64 | 5.33 |
| Electric screwdriver | 12.59 | 7.04 | 0.15 | 13.97 | 7.53 | 0.15 | 13.95 | 8.17 | 4.29 |
| Excavator | 13.01 | 9.39 | 3.56 | 14.19 | 9.36 | 3.63 | 15.43 | 9.18 | 3.23 |
| Filing wood | 13.65 | 7.73 | 1.14 | 15.1 | 7.84 | 1.14 | 15.36 | 8.04 | 5.91 |
| Grader | 13.12 | 7.44 | 1.40 | 13.53 | 7.39 | 1.40 | 13.82 | 7.87 | 6.39 |
| Grinder | 8.82 | 5.56 | 0.34 | 10.29 | 5.89 | 0.34 | 10.3 | 6.65 | 3.10 |
| Hammering | 8.11 | 5.41 | 0.04 | 10.77 | 5.82 | 0.12 | 13.29 | 7.12 | 6.33 |

TABLE 4-continued

Noise attenuation achieved by CsNNet, CsNNet-200, and FxLMS.

| | Nonlinearity | | | | | | | | |
|---|---|---|---|---|---|---|---|---|---|
| | $\eta^2 = 0.1$ (Severe) | | | $\eta^2 = 0.5$ (Moderate) | | | $\eta^2 = $ inf (Linear) | | |
| | CsNNet | CsNNet-200 | FxLMS | CsNNet | CsNNet-200 | FxLMS | CsNNet | CsNNet-200 | FxLMS |
| Hand saw | 13.56 | 7.39 | 0.10 | 13.92 | 7.47 | 0.19 | 14.04 | 7.47 | 6.17 |
| Jackhammer | 12.48 | 7.35 | 1.11 | 13.3 | 7.67 | 1.20 | 14.28 | 8.26 | 5.05 |
| Sanding | 11.03 | 6.49 | −0.02 | 12.07 | 6.79 | −0.02 | 12.06 | 7.20 | 4.36 |
| Truck | 12.64 | 7.93 | 1.20 | 12.91 | 8.03 | 1.39 | 13.77 | 7.83 | 3.22 |
| welding | 9.33 | 6.16 | −0.37 | 9.49 | 5.65 | −0.31 | 9.67 | 4.93 | 3.65 |
| Average (dB) | 12.6 | 8.16 | 2.16 | 13.49 | 8.28 | 2.21 | 14.07 | 8.65 | 4.73 |

TABLE 5

Noise attenuation performance (in dB) of ANC algorithms for mixed noise datasets in different ANC nonlinearities.

| | Nonlinearity | | | | | | | | |
|---|---|---|---|---|---|---|---|---|---|
| | $\eta^2 = 0.1$ (Severe) | | | $\eta^2 = 0.5$ (Moderate) Controller | | | $\eta^2 = $ inf (Linear) | | |
| Noise type | CsNNet | CsNNet-200 | FxLMS | CsNNet | CsNNet-200 | FxLMS | CsNNet | CsNNet-200 | FxLMS |
| MN1 | 10.9 | 6.50 | 1.48 | 11.47 | 6.76 | 2.06 | 12.16 | 7.64 | 2.2 |
| MN2 | 11.39 | 7.41 | 2.03 | 11.3 | 7.85 | 2.51 | 11.51 | 8.24 | 2.63 |
| MN3 | 10.34 | 7.05 | 2.3 | 10.53 | 7.44 | 2.70 | 10.53 | 7.92 | 2.83 |
| Average noise attenuation (dB) | 10.88 | 6.99 | 1.94 | 11.10 | 7.35 | 2.42 | 11.40 | 7.93 | 2.55 |

TABLE 6

Noise cancellation (in dB) for traditional algorithms, Deep-ANC, and CsNNet in different noisy environments and nonlinear distortions.

| | Noise type | | | | | | | | |
|---|---|---|---|---|---|---|---|---|---|
| | Engine (dB) | | | Factory (dB) | | | Babble (dB) | | |
| Nonlinearity ($\eta^2$) | ∞ | 0.5 | 0.1 | ∞ | 0.5 | 0.1 | ∞ | 0.5 | 0.1 |
| FxLMS | 6.78 | 5.26 | 4.54 | 5.88 | 4.73 | 1.67 | 6.04 | 4.32 | 3.37 |
| THF-FxLMS | — | 6.70 | 6.55 | — | 5.86 | 5.75 | — | 6.02 | 5.97 |
| Deep-ANC | 11.07 | 10.98 | 10.60 | 9.58 | 9.50 | 9.17 | 9.49 | 9.45 | 9.27 |
| CsNNet | 13.35 | 11.30 | 11.10 | 18.41 | 16.47 | 14.78 | 14.86 | 14.69 | 14.30 |
| Deep-ANC-320 | 7.93 | 7.89 | 7.72 | 6.97 | 6.94 | 6.81 | 7.00 | 7.00 | 6.98 |
| CsNNet-200 | 10.58 | 8.63 | 8.47 | 15.01 | 12.79 | 12.32 | 10.17 | 9.25 | 9.11 |

TABLE 7

Noise attenuation comparison between single- and multi-channel CsNNet with nonlinearity $\eta^2 = 0.5$.

| Noise type | CsNNet-200 | MC-CsNNet-200 |
|---|---|---|
| Bulldozer | 10.15 | 12.53 |
| Ambience | 20.68 | 22.14 |
| Cement mixer | 6.95 | 8.45 |
| Electric drill | 7.62 | 9.04 |
| Electric sander | 7.59 | 8.97 |
| Electric saw | 8.40 | 10.85 |
| Electric screwdriver | 7.53 | 9.15 |
| Excavator | 9.37 | 11.03 |
| Filing wood | 7.84 | 9.07 |
| Grader | 7.38 | 9.10 |
| Grinder | 5.89 | 7.50 |
| Hammering | 5.83 | 8.79 |
| Hand saw | 7.47 | 8.86 |
| Jackhammer | 7.66 | 9.45 |
| Sanding | 6.78 | 8.36 |
| Truck | 8.06 | 9.50 |
| Welding | 5.65 | 7.55 |
| Average (dB) | 8.28 | 10.02 |

The invention claimed is:

1. A computer-implemented method for generating anti-noise using an anti-noise generator to suppress noise from a noise source in an environment, the computer-implemented method comprising:
   receiving a sound signal representative of ambient sound in the environment including the noise from the noise source and the anti-noise from the anti-noise generator, wherein the ambient sound also includes propagation noise from the environment;
   processing the sound signal using a deep learning algorithm configured to generate an anti-noise signal to form the anti-noise, wherein the deep learning algorithm comprises:
      an encoder module configured to receive the sound signal and to perform feature extraction to form a feature map, wherein the encoder module comprises a plurality of atrous separable convolutions and a plurality of depthwise separable convolutions, wherein the encoder module is iterated so as to have plural iterations thereof and thereby forming a plurality of feature maps;
      an attention module configured to receive the feature maps of the plural iterations of the encoder module and to generate plural attention maps respectively based thereon;
      a recurrent neural network having plural layers of long short-term memory type and configured to receive the feature map of a final one of the iterations of the encoder module, wherein the recurrent neural network is configured to predict a future portion of the sound signal and to model temporal features of the feature map of the final iteration of the encoder module; and
      a decoder module configured to receive an output of the recurrent neural network and the plural attention maps from the attention module, wherein the decoder module is configured to map the output of the recurrent neural network to the anti-noise signal having common dimensions as the sound signal, wherein the decoder module comprises a plurality of transposed atrous separable convolutions and a transposed depthwise separable convolution, wherein the decoder module is iterated so as to have plural iterations thereof; and
   using the anti-noise signal to generate the anti-noise with the anti-noise generator.

2. The computer-implemented method of claim 1 wherein, when the sound signal is captured by a single audio sensor configured to capture sound, the deep learning algorithm further comprises a pointwise convolution after the decoder module and configured to receive an output thereof.

3. The computer-implemented method of claim 1 wherein the encoder module comprises:
   an input layer configured to form an output thereof the same as an input thereto;
   a first one of the plurality of depthwise separable convolutions configured to receive the output of the input layer of the encoder module;
   a first one of the plurality of atrous separable convolutions having a first dilation rate and configured to receive the output of the input layer of the encoder module;
   a second one of the plurality of atrous separable convolutions having a second dilation rate different than the first dilation rate and configured to receive the output of the input layer of the encoder module;
   a second one of the plurality of depthwise separable convolutions receiving as input thereto concatenated outputs of the first one of the plurality of depthwise separable convolution and the first and second ones of the plurality of atrous separable convolutions and forming an output of a respective one of the plural iterations of the encoder module;
   wherein, for a first one of the plural iterations of the encoder module, the input of the input layer is the sound signal; and
   wherein, for subsequent ones of the plural iterations of the encoder module after the first iteration thereof, the input of the input layer is an output of the second one of the plurality of depthwise separable convolutions;
   wherein outputs of the encoder module comprise the output of the second one of the plurality of depthwise separable convolutions of the plural iterations of the encoder module.

4. The computer-implemented method of claim 3 wherein the encoder module is iterated four times.

5. The computer-implemented method of claim 3 wherein the second dilation rate is twice the first dilation rate.

6. The computer-implemented method of claim 3 wherein the first dilation rate is two and the second dilation rate is four.

7. The computer-implemented method of claim 3 wherein final depthwise convolutions of each of the plurality of depthwise separable convolutions and the plurality of atrous separable convolutions are followed by a parametric rectified linear unit activation function.

8. The computer-implemented method of claim 1 wherein the decoder module comprises:
   an input layer having a first concatenated portion and a second concatenated portion which are concatenated to form an output of the input layer of the decoder module, wherein, in a first one of the plural iterations of the decoder module, the first concatenated portion of the input layer is the output of the recurrent neural network and in each subsequent one of the plural iterations after the first iteration, the first concatenated portion is an output of a preceding one of the plural iterations of the decoder module, wherein the second concatenated portion is a respective one of the plural attention maps of the attention module;
   a first one of the plurality of transposed atrous separable convolutions having a first dilation rate and configured to receive an output of the input layer of the decoder module;
   the transposed depthwise separable convolution being configured to receive the output of the input layer of the decoder module;
   a second one of the plurality of transposed atrous separable convolutions having a second dilation rate different than the first dilation rate of the first one of the plurality of transposed atrous separable convolutions and configured to receive the output of the input layer of the decoder module; and
   an output layer configured to form an output of the decoder module in the form of a summation of outputs of the first and second ones of the plurality of transposed atrous separable convolutions and the transposed depthwise separable convolution.

9. The computer-implemented method of claim 8 wherein the decoder module is iterated four times.

10. The computer-implemented method of claim 8 wherein the second dilation rate of the second one of the plurality of transposed atrous separable convolutions is twice the first dilation rate of the first one of the plurality of transposed atrous separable convolutions.

11. The computer-implemented method of claim 8 wherein the first dilation rate of the first one of the plurality of transposed atrous separable convolutions is two and the second dilation rate of the second one of the plurality of transposed atrous separable convolution is four.

\* \* \* \* \*